(12) United States Patent
Dettinger et al.

(10) Patent No.: US 7,680,780 B2
(45) Date of Patent: Mar. 16, 2010

(54) TECHNIQUES FOR PROCESSING DATA FROM A MULTILINGUAL DATABASE

(75) Inventors: Richard D. Dettinger, Rochester, MN (US); Janice Glowacki, Rochester, MN (US); Frederick A. Kulack, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 341 days.

(21) Appl. No.: 11/697,377

(22) Filed: Apr. 6, 2007

(65) Prior Publication Data

US 2008/0249998 A1 Oct. 9, 2008

(51) Int. Cl.
G06F 17/30 (2006.01)
(52) U.S. Cl. .............................................. 707/3; 707/4
(58) Field of Classification Search ..................... 707/3, 707/10, 6, 4, 102
See application file for complete search history.

(56) References Cited

U.S. PATENT DOCUMENTS

| | | | |
|---|---|---|---|
| 5,175,814 A | | 12/1992 | Anick et al. |
| 5,692,181 A | * | 11/1997 | Anand et al. ................. 707/102 |
| 5,710,900 A | * | 1/1998 | Anand et al. ................. 715/764 |
| 5,734,887 A | | 3/1998 | Kingberg et al. |
| 5,787,418 A | | 7/1998 | Hibbetts et al. |
| 5,924,089 A | | 7/1999 | Mocek et al. |
| 5,950,194 A | | 9/1999 | Bennett et al. |
| 5,978,798 A | * | 11/1999 | Poznanski et al. ............... 707/4 |
| 6,006,221 A | * | 12/1999 | Liddy et al. ..................... 707/5 |
| 6,026,388 A | | 2/2000 | Liddy et al. |
| 6,026,395 A | | 2/2000 | Bennett et al. |
| 6,269,368 B1 | * | 7/2001 | Diamond ........................ 707/6 |
| 6,345,245 B1 | | 2/2002 | Sugiyama et al. |
| 6,460,029 B1 | | 10/2002 | Fries et al. |
| 6,725,227 B1 | | 4/2004 | Li |
| 6,996,558 B2 | | 2/2006 | Dettinger et al. |
| 7,269,598 B2 | * | 9/2007 | Marchisio ................... 707/102 |
| 7,373,341 B2 | * | 5/2008 | Polo-Malouvier .............. 707/3 |
| 7,472,116 B2 | * | 12/2008 | Dettinger et al. ............... 707/3 |
| 2001/0049697 A1 | | 12/2001 | Johndrew et al. |
| 2002/0087531 A1 | | 7/2002 | Hara et al. |
| 2003/0037048 A1 | | 2/2003 | Kabra et al. |

(Continued)

OTHER PUBLICATIONS

Eric Wehrli, "Multilingaul translation model based on object-oriented design", Feb. 28, 2006.*

(Continued)

*Primary Examiner*—Jean M Corrielus
(74) *Attorney, Agent, or Firm*—Patterson & Sheridan, LLP

(57) ABSTRACT

A method, system and article of manufacture for providing natural language support for users running queries against a multilingual database. One embodiment comprises identifying one or more physical values defined by physical data in the multilingual database for a query result associated with an executed query. At least one translation function configured to transform at least a portion of the identified physical values defined in one or more different natural languages into alternative values defined in a selected language is executed. From each executed translation function, a data structure mapping at least a portion of the identified physical values to translated values defined in the selected language is identified and the translated values defining the alternative values defined in the selected language are retrieved from each identified data structure. The query result associated with the executed query including the alternative values defined in the selected language is output.

22 Claims, 16 Drawing Sheets

U.S. PATENT DOCUMENTS

| | | |
|---|---|---|
| 2003/0172056 A1 | 9/2003 | Dettinger et al. |
| 2003/0233224 A1 | 12/2003 | Marchisio et al. |
| 2004/0034521 A1 | 2/2004 | Kawakura et al. |
| 2004/0046789 A1 | 3/2004 | Inanoria |
| 2004/0221235 A1 | 11/2004 | Marchisio et al. |
| 2005/0091036 A1 | 4/2005 | Shackleton et al. |
| 2005/0114329 A1 | 5/2005 | Dettinger et al. |
| 2006/0122993 A1 | 6/2006 | Dettinger et al. |
| 2006/0149716 A1 | 7/2006 | Polo-Malouvier |
| 2007/0100809 A1 | 5/2007 | Dettinger et al. |
| 2008/0016049 A1 | 1/2008 | Dettinger et al. |
| 2008/0281804 A1* | 11/2008 | Zhao et al. .................... 707/5 |

OTHER PUBLICATIONS

Christna Vertan, "Querying Multilingual semantic web in Natural language", 2003.*

Romary et al., "An Abstract model for the representation of multilingual terminological data: TMF-Terminological markup framework", 1998.*

Richard D. Dettinger et al., U.S. Appl. No. 11/458,940, entitled "Natural Language Support for Query Results", filed Jul. 12, 2006.

* cited by examiner

TECHNIQUES FOR PROCESSING DATA FROM A MULTILINGUAL DATABASE

BACKGROUND OF THE INVENTION

1. Field of the Invention

The present invention generally relates to data processing in databases and, more particularly, to providing natural language support for users running queries against a multilingual database.

2. Description of the Related Art

Databases are computerized information storage and retrieval systems. A relational database management system is a computer database management system (DBMS) that uses relational techniques for storing and retrieving data. The most prevalent type of database is the relational database, a tabular database in which data is defined so that it can be reorganized and accessed in a number of different ways. A distributed database is one that can be dispersed or replicated among different points in a network. An object-oriented programming database is one that is congruent with the data defined in object classes and subclasses.

Regardless of the particular architecture, a DBMS can be structured to support a variety of different types of operations for a requesting entity (e.g., an application, the operating system or an end user). Such operations can be configured to retrieve, add, modify and delete information being stored and managed by the DBMS. Standard database access methods support these operations using high-level database query languages, such as the Structured Query Language (SQL).

One type of functionality that a DBMS must support for end users is natural language support. By way of example, one framework provides natural language support for users running queries in an abstract database environment. The abstract database environment provides a requesting entity (i.e., an end-user or front-end application) with a data abstraction model that defines an abstract representation of data stored in an underlying physical storage mechanism, such as a relational database. The data abstraction model facilitates the process of query composition by allowing a user to compose abstract queries without needing to understand the schema of the physical data. The framework provides a natural language resource component that defines translation information for a given data abstraction model using one or more natural language expressions. The natural language expression(s) can be used to translate expressions occurring in a default language in an abstract query (that is composed using the given data abstraction model) into another language defined by the natural language resource component. Furthermore, query results obtained in the default language can be translated into the other language using user-defined functions that contain suitable translation information.

The foregoing framework is satisfactory to provide natural language support for single-language databases (i.e., databases having physical data that is provided in a single default language). However, databases may contain physical data provided in one or more different languages that is originated from one or more different geographic locations. In this case (i.e., when dealing with a multi-language or multilingual database), the foregoing framework is unsatisfactory.

Therefore, there is a need for an improved and more flexible technique for providing natural language support for users running queries against a multilingual database.

SUMMARY OF THE INVENTION

The present invention is generally directed to a method, system and article of manufacture for providing natural language support in a database environment and, more particularly, for providing natural language support for users running queries against a multilingual database.

One embodiment provides a computer-implemented method of providing language transformation support for a query result obtained in response to execution of a query against a multilingual database containing physical data provided in a plurality of different natural languages. The method comprises identifying one or more physical values defined by the physical data in the multilingual database for the query result associated with the executed query. At least one translation function configured to transform at least a portion of the identified physical values defined in at least one language of the plurality of different natural languages into alternative values defined in a selected language is executed, comprising: (i) identifying, from each executed translation function, a data structure mapping at least a portion of the identified physical values to translated values defined in the selected language, and (ii) retrieving the translated values in the selected language from each identified data structure, the retrieved translated values of all identified data structures defining the alternative values defined in the selected language. The method further comprises outputting the query result associated with the executed query including the alternative values defined in the selected language.

Another embodiment provides a computer-readable medium containing a program which, when executed by a processor, performs a process of providing language transformation support for a query result obtained in response to execution of a query against a multilingual database containing physical data provided in a plurality of different natural languages. The process comprises identifying one or more physical values defined by the physical data in the multilingual database for the query result associated with the executed query. At least one translation function configured to transform at least a portion of the identified physical values defined in at least one language of the plurality of different natural languages into alternative values defined in a selected language is executed, comprising: (i) identifying, from each executed translation function, a data structure mapping at least a portion of the identified physical values to translated values defined in the selected language, and (ii) retrieving the translated values in the selected language from each identified data structure, the retrieved translated values of all identified data structures defining the alternative values defined in the selected language. The process further comprises outputting the query result associated with the executed query including the alternative values defined in the selected language.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Introduction

Figure 1:
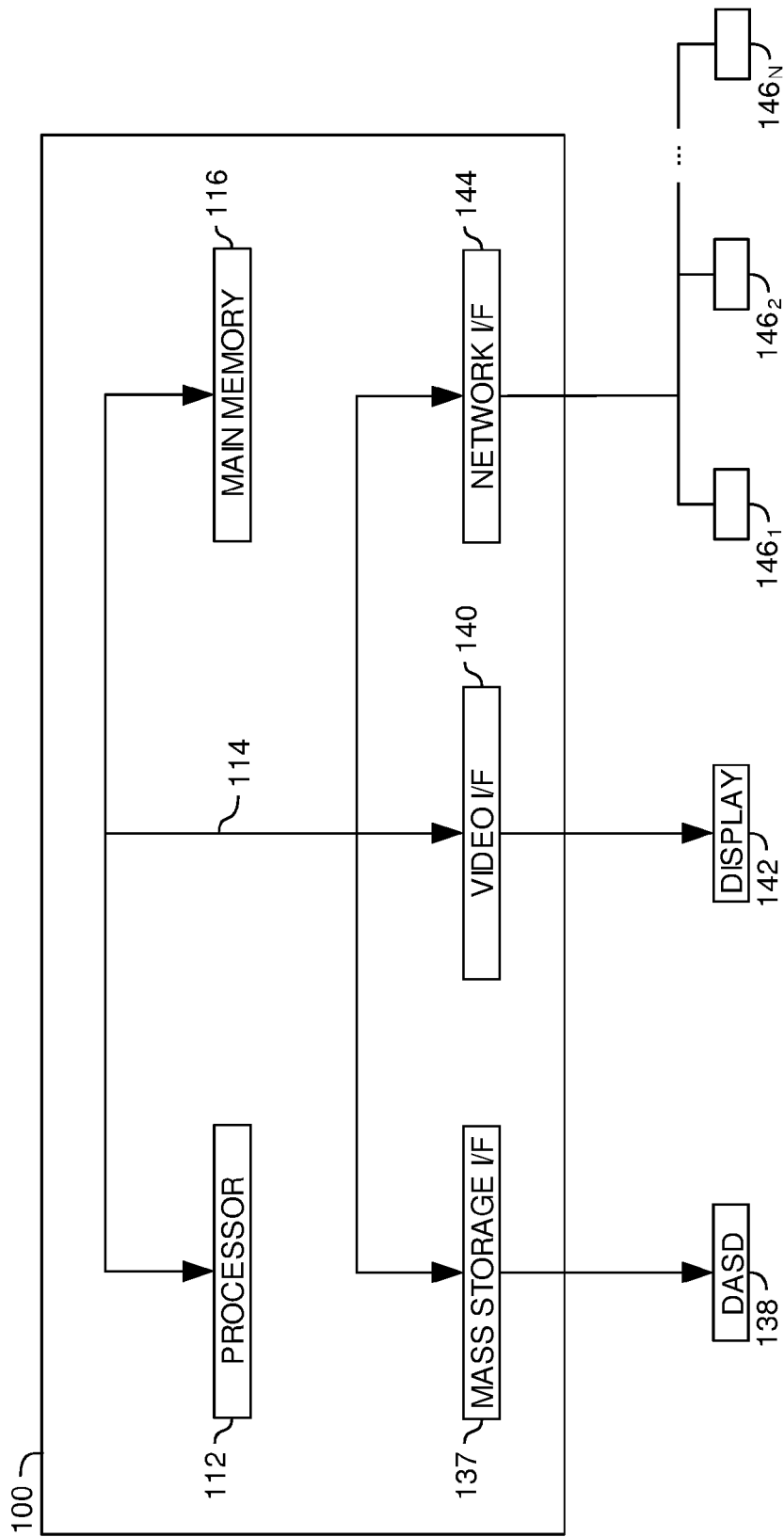
FIG. 1 is a computer system illustratively utilized in accordance with the invention.

The present invention is generally directed to a method, system and article of manufacture for providing natural language support in a database environment and, more particularly, for providing natural language support for users running abstract queries against a multilingual database. A multilingual database is a database having physical data that is provided in one or more different languages and originated from one or more different geographic locations.

In one embodiment, an abstract query is issued from a user against an underlying multilingual database. The abstract query is specified using one or more logical fields defined by a data abstraction model abstractly describing physical data in the multilingual database. At least one logical field used for creation of the abstract query is associated with physical values defined by the physical data of the multilingual database that are defined in a plurality of different natural languages.

For execution, the abstract query is transformed into an executable query capable of being executed against the multilingual database on the basis of the data abstraction model. Thereby, a query contribution is generated in the executable query for the at least one logical field. The generated query contribution includes a function call for a translation function that is configured to transform the physical values that are associated with the at least one logical field into alternative values defined in a selected natural language (i.e., a language written by, and readable by, human-beings). The executable query is then executed against the multilingual database to obtain a corresponding result set.

As a result of executing the executable query against the multilingual database, at least a portion of the physical values that are associated with the at least one logical field are retrieved and the translation function is executed. In order to determine corresponding alternative values in the selected language for the at least one portion of the physical values, the translation function accesses associated translation information. In one embodiment, the associated translation information includes an alternative value defined in the selected natural language for each physical value that is associated with the at least one logical field. Accordingly, the alternative values for the at least one portion of the physical values can be retrieved from the translation information and included with the corresponding result set for the executable query. The result set can, thus, be output in the selected natural language to the user.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

One embodiment of the invention is implemented as a program product for use with a computer system such as, for example, computer system 110 shown in FIG. 1 and described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD- or DVD-ROM disks readable by a CD- or DVD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information to/from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Computing Environment

FIG. 1 shows a computer 100 (which is part of a computer system 110) that becomes a special-purpose computer according to an embodiment of the invention when configured with the features and functionality described herein. The computer 100 may represent any type of computer, computer system or other programmable electronic device, including a client computer, a server computer, a portable computer, a personal digital assistant (PDA), an embedded controller, a PC-based server, a minicomputer, a midrange computer, a mainframe computer, and other computers adapted to support the methods, apparatus, and article of manufacture of the invention.

Illustratively, the computer 100 is part of a networked system 110. In this regard, the invention may be practiced in a distributed computing environment in which tasks are performed by remote processing devices that are linked through a communications network. In a distributed computing environment, program modules may be located in both local and remote memory storage devices. In another embodiment, the computer 100 is a standalone device. For purposes of construing the claims, the term "computer" shall mean any computerized device having at least one processor. The computer may be a standalone device or part of a network in which case the computer may be coupled by communication means (e.g., a local area network or a wide area network) to another device (i.e., another computer).

In any case, it is understood that FIG. 1 is merely one configuration for a computer system. Embodiments of the invention can apply to any comparable configuration, regardless of whether the computer 100 is a complicated multi-user apparatus, a single-user workstation, or a network appliance that does not have non-volatile storage of its own.

The computer 100 could include a number of operators and peripheral systems as shown, for example, by a mass storage interface 137 operably connected to a storage device 138, by a video interface 140 operably connected to a display 142, and by a network interface 144 operably connected to the plurality of networked devices 146 (which may be representative of the Internet) via a suitable network. Although storage 138 is shown as a single unit, it could be any combination of fixed and/or removable storage devices, such as fixed disc drives, floppy disc drives, tape drives, removable memory cards, or optical storage. The display 142 may be any video output device for outputting viewable information.

Computer 100 is shown comprising at least one processor 112, which obtains instructions and data via a bus 114 from a main memory 116. The processor 112 could be any processor adapted to support the methods of the invention. In particular, the computer processor 112 is selected to support the features of the present invention. Illustratively, the processor is a PowerPC® processor available from International Business Machines Corporation of Armonk, N.Y.

The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in the computer system 110, for example, any storage capacity used as virtual memory or stored on a mass storage device (e.g., direct access storage device 138) or on another computer coupled to the computer 100 via bus 114. Thus, main memory 116 and storage device 138 could be part of one virtual address space spanning multiple primary and secondary storage devices.

An Exemplary Database and Query Environment

Figure 2:
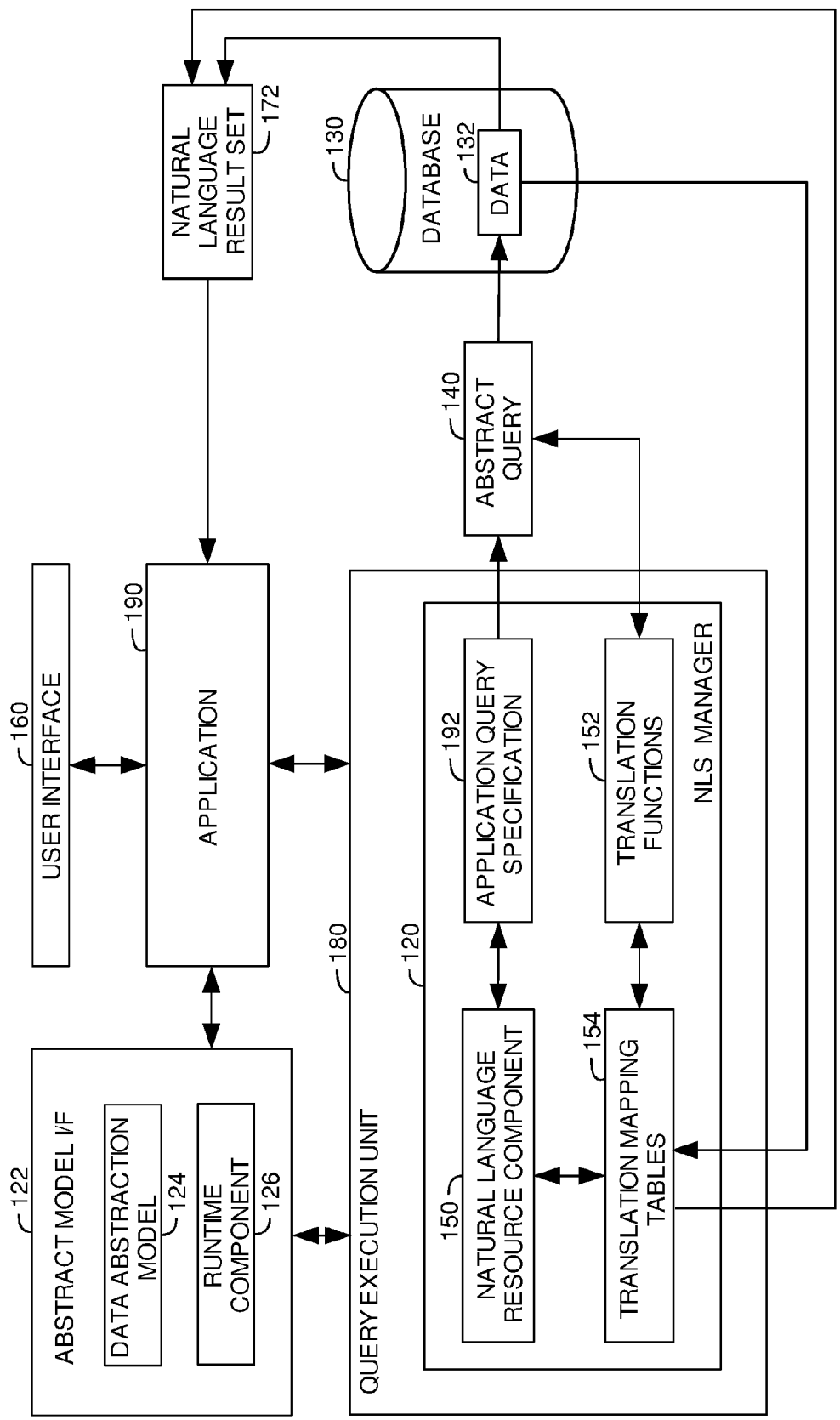
FIG. 2 is a relational view of software components in one embodiment.

FIG. 2 illustrates a relational view of software components, according to one embodiment of the invention. The software components include a database 130, an abstract model interface 122, a user interface 160, a query execution unit 180 and one or more applications 190 (only one application is illustrated for simplicity).

According to one aspect, the application 190 (and more generally, any requesting entity including, at the highest level, users) issues queries, such as abstract query 140, against data 132 in the database 130. The queries issued by the application 190 are defined according to an application query specification 192 and may be predefined (i.e., hard coded as part of the application 190) or generated in response to input (e.g., user input). The application query specification(s) 192 and the abstract model interface 122 are further described below with reference to FIGS. 3-5.

In one embodiment, the queries issued by the application 190 are created by users using the user interface 160, which can be any suitable user interface configured to create/submit queries. According to one aspect, the user interface 160 is a graphical user interface. However, it should be noted that the user interface 160 is only shown by way of example; any suitable requesting entity may create and submit queries against the database 130 (e.g., the application 190, an operating system or an end user). Accordingly, all such implementations are broadly contemplated.

In one embodiment, the requesting entity accesses a suitable database connectivity tool such as a Web application, an Open DataBase Connectivity (ODBC) driver, a Java® DataBase Connectivity (JDBC) driver or a Java® Application Programming Interface (Java® API) for creation of a query. A Web application is an application that is accessible by a Web browser and that provides some function beyond static display of information, for instance by allowing the requesting entity to query the database 130. An ODBC driver is a driver that provides a set of standard application programming interfaces to perform database functions such as connecting to the database 130, performing dynamic SQL functions, and committing or rolling back database transactions. A JDBC driver is a program included with a database management system to support JDBC standard access between the database 130 and Java® applications. A Java® API is a Java®-based interface that allows an application program (e.g., the requesting entity, the ODBC or the JDBC) that is written in a high-level language to use specific data or functions of an operating system or another program (e.g., the application 190).

Accordingly, the queries issued by the application 190 can be in physical form, such as SQL and/or XML queries, which are consistent with the physical representation of the data 132 in the database 130. Alternatively, the queries issued by the application 190 are composed using the abstract model interface 122. Such queries are referred to herein as "abstract queries". More specifically, abstract queries are created on the basis of logical fields defined by an underlying data abstraction model.

In the illustrated example, the abstract query 140 is created on the basis of logical fields defined by a data abstraction model 124. In one embodiment, the abstract query 140 is created by creating a results specification and, if required, selection criteria, as explained in more detail below with reference to FIGS. 3B-C. The results specification is defined by one or more result fields specifying what data elements should be returned from the database 130. The selection criteria is defined using one or more condition fields in corresponding query conditions that are configured to evaluate whether a given element of the data 132 should be returned. The result field(s) and the condition field(s) are defined using the logical fields of the data abstraction model 124.

The abstract queries are transformed into a form consistent with the physical representation of the data 132 for execution.

For instance, the abstract queries are transformed by a runtime component 126 into concrete (i.e., executable) queries which are executed by the query execution unit 180 against the data 132 of the database 130.

The database 130 is representative of any collection of data regardless of the particular physical representation. By way of illustration, the database 130 may be organized according to a relational schema (accessible by SQL queries) or according to an XML schema (accessible by XML queries). However, the invention is not limited to a particular schema and contemplates extensions to schemas presently unknown. As used herein, the term "schema" generically refers to a particular arrangement of data.

In one embodiment, the database 130 is a multilingual database. In other words, the database 130 contains physical data that is provided in one or more different languages and originated from one or more different geographic locations. For instance, the database 130 is a medical database used to collect data about patients from medical institutions that are located in different countries, such as the United States of America, Mexico and Germany. Accordingly, data coming from the American medical institution(s) can be defined in English, data from the Mexican medical institution(s) in Spanish and data from the German medical institution(s) in German.

In one embodiment, the query execution unit 180 includes a natural language support (NLS) manager 120. The NLS manager 120 provides natural language support for users running queries against the multilingual database 130. Interaction and operation of the NLS manager 120, the application 190 and the abstract model interface 122 to provide natural language support in query execution is explained in more detail below with reference to FIGS. 6-15.

It should be noted that the query execution unit 180 illustratively only includes the NLS manager 120, for simplicity. However, the query execution unit 180 may include other components, such as a query engine, a query parser and a query optimizer. A query parser is generally configured to accept a received executable query input from a requesting entity, such as the application(s) 190, and then parse the received executable query. The query parser may then forward the parsed executable query to the query optimizer for optimization. A query optimizer is an application program which is configured to construct a near optimal search strategy (known as an "access plan") for a given set of search parameters, according to known characteristics of an underlying database (e.g., the database 130), an underlying system on which the search strategy will be executed (e.g., computer system 110 of FIG. 1), and/or optional user specified optimization goals. But not all strategies are equal and various factors may affect the choice of an optimum search strategy. However, in general such search strategies merely determine an optimized use of available hardware/software components to execute respective queries. Once an access plan is selected, the query engine may then execute the executable query according to the selected access plan.

Illustratively, the NLS manager 120 includes a natural language resource component 150 (hereinafter referred to as language resource component 150). The language resource component 150 defines a natural language expression for user-viewable elements defined by logical fields of the data abstraction model 124. In one embodiment, the language resource component 150 defines a natural language expression for each attribute (e.g., name) and/or corresponding value in a logical field. These natural language expressions can be different from expressions defined by the data abstraction model 124 (hereinafter referred to as "default language expressions"). Accordingly, the language resource component 150 is considered to provide translation information for the data abstraction model 124.

More generally, the language resource component 150 includes translations for one or more of the elements (e.g., logical field names, values, etc.) defined by the data abstraction model 124 from a first natural language expression (e.g., the default language expressions) to a second natural language expression (e.g., expressions in a selected foreign language or a selected terminology). For a given data abstraction model 124, the language resource component 150 can further be configured to describe translations from the first natural language expression into two or more other natural language expressions. Thus, in one embodiment, which instance of the data abstraction model 124 a user "sees" will depend upon which natural language expression files are loaded to define the language resource component 150. In any case, the various natural language expressions can be different languages or different variations (i.e., terminologies) on the same language.

It is noted that particular embodiments described herein can refer to translation of selected elements of the data abstraction model 124. For example, embodiments may be described with reference to field name translations (e.g., "gender" translated to "sex"). However, references to translations of specific data abstraction model elements are done merely for purposes of illustration and not limiting of the invention. Thus, it is broadly contemplated that any element of the data abstraction model 124 can be translated.

Figure 11:
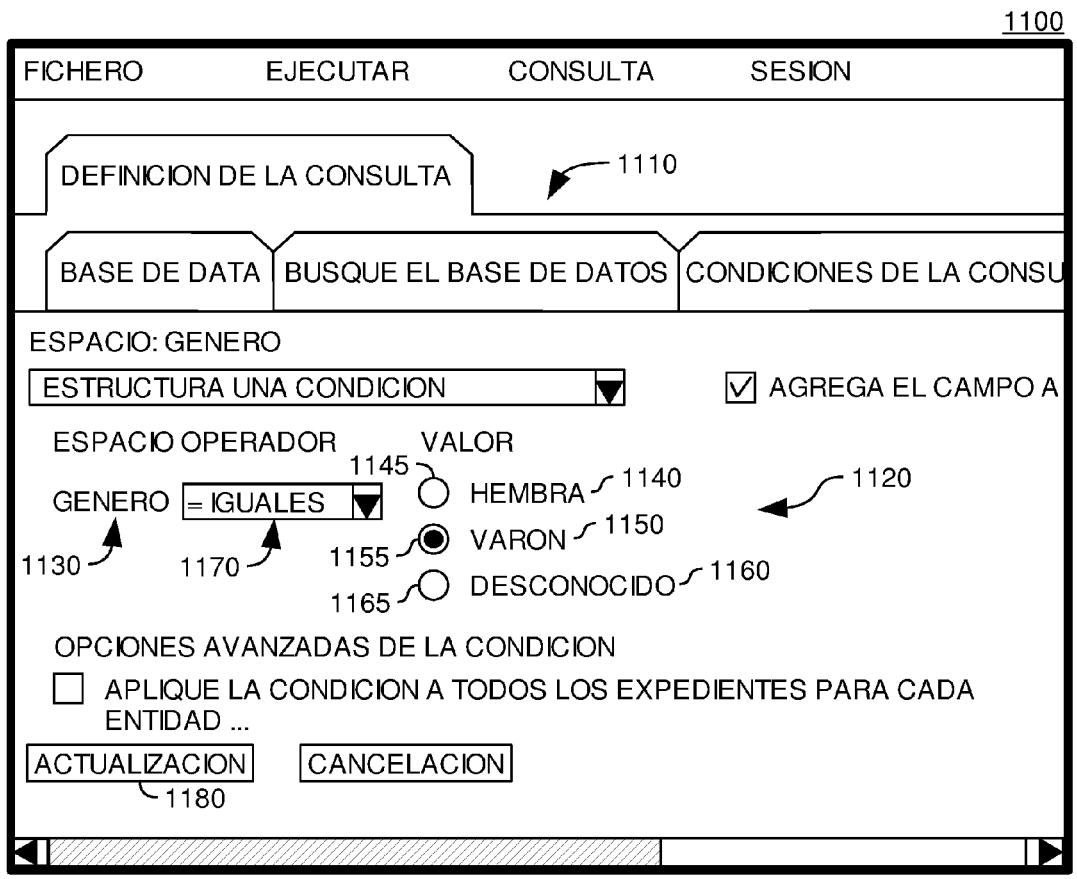
FIGS. 11-12 are screenshots illustrating natural language support for users running queries against a database in one embodiment.
Figure 12:
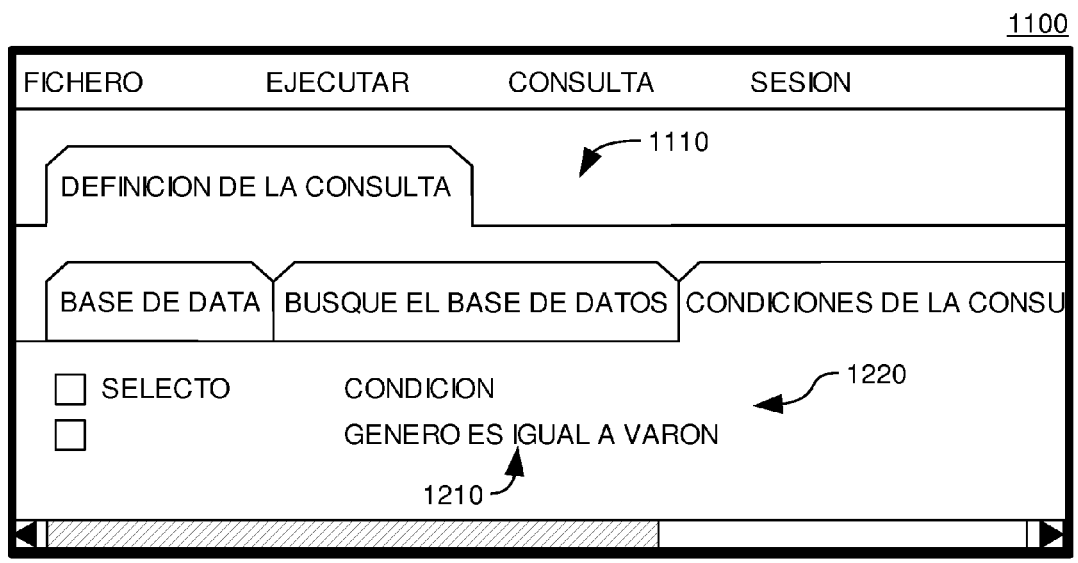

In one embodiment, the language resource component 150 is used for natural language support of users running an abstract query, such as the abstract query 140, against the data 132 of the database 130. To this end, the language resource component 150 defines one or more natural language expressions for each of a plurality of logical fields of the data abstraction model 124 which provides definitions (also referred to herein as "specifications") for the plurality of logical fields. More specifically, the language resource component 150 can be used to determine natural language expression(s) for elements of logical fields displayed to the user for creation of the abstract query 140. Thus, the elements of the logical fields that are available for specification of the abstract query 140 can be displayed to the user in the determined natural language expression(s). Accordingly, the user can compose the abstract query 140 using the one or more elements of the logical fields in the displayed natural language expression(s). Query creation using natural language expressions is illustrated in FIGS. 11-12 which show exemplary screenshots illustrating display of elements of logical fields using exemplary Spanish expressions.

Illustratively, the NLS manager 120 further includes the application query specification 192, one or more translation functions 152 and one or more translation mapping tables 154. In one embodiment, each of the translation mapping tables 154 is created for one or more logical fields of the data abstraction model 124. According to one aspect, the translation mapping tables 154 can be created on the basis of the language resource component 150.

Each of the translation mapping tables 154 includes one or more translated values defined in one or more natural languages for each physical value of the data 132 that is associated with the one or more logical fields for which the translation mapping table 154 is created. Accordingly, the translation mapping tables 154 are considered to provide translation information for physical values defining at least a portion of the data 132 of the multilingual database 130. Each translation function 152 is configured to identify one or more of the translation mapping tables 154 for a given logical field and to retrieve required alternative values for an underlying result set from translated values included therewith, as described in more detail below.

When executing the executable query against the database 130, the query execution unit 180 determines physical values from the data 132 of the multilingual database 130 for a corresponding result set. In the illustrated example, the query execution unit 180 determines the physical values for one or more logical fields specified by the abstract query 140. As noted above, the determined physical values can be defined in one or more different natural languages, thereby resulting in a multilingual query result. However, in order to return a natural language result set 172 in a selected language to the application 190, the query execution unit 180 executes the translation function(s) 152 on the determined physical values.

The executed translation function(s) 154 accesses the translation mapping table(s) 154 to determine alternative values in the selected language for the determined physical values. In one embodiment, the selected language uses natural language expressions which are considered to be more meaningful to users and, thus, more user-friendly. More specifically, the alternative values can be adapted to a role of a given user or a preferred language used by the user. The retrieved alternative values are included with the natural language result set 172. Accordingly, in one embodiment the natural language result set 172 only includes data that is defined in the selected language. The natural language result set 172 is then output to the application 190. Query execution and generation of the natural language result set 172 in a selected language is described in more detail below with reference to FIGS. 13-15.

Logical/Runtime View of Environment

Figure 3A:
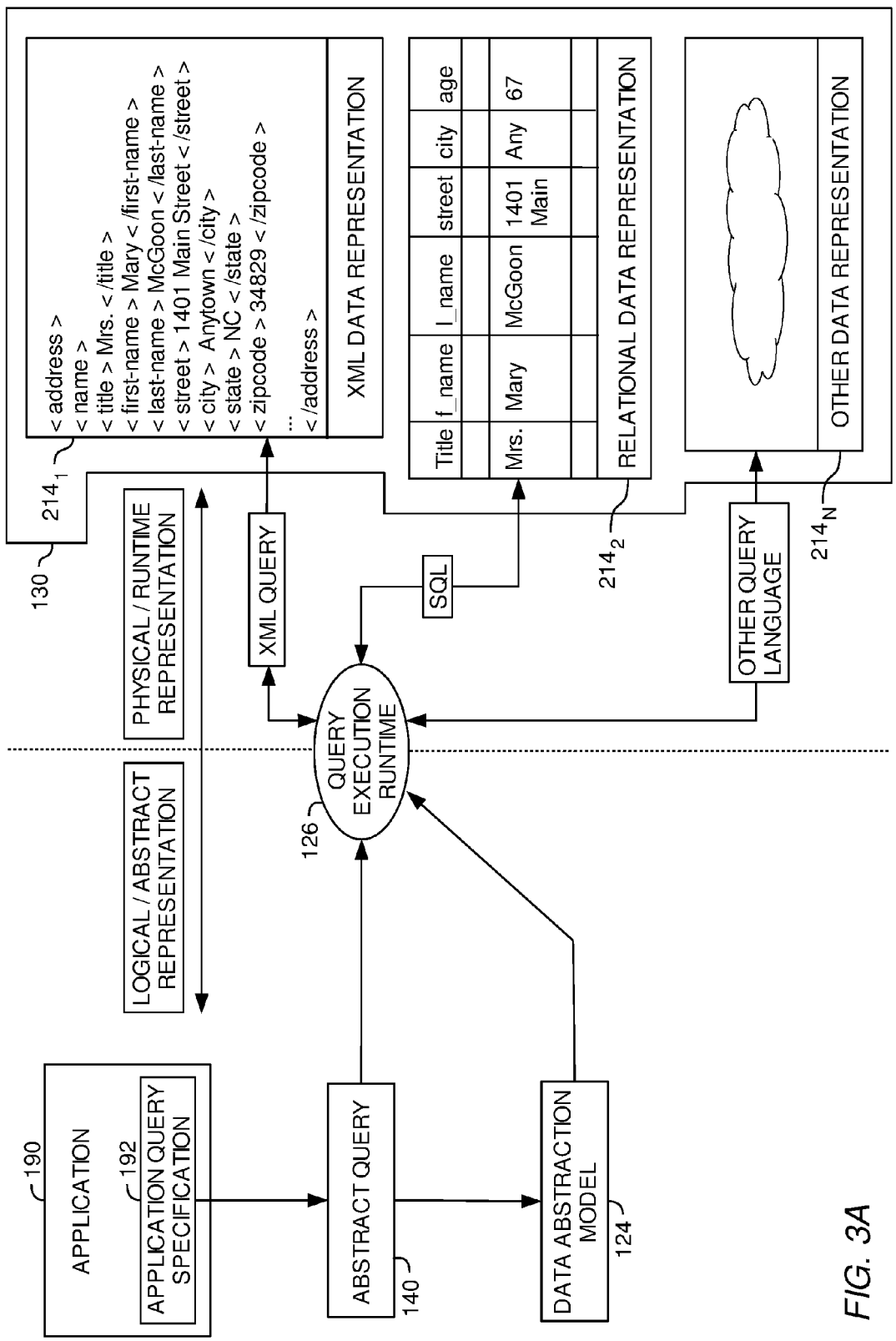
FIGS. 3A-C are relational views of software components for abstract query management in one embodiment.

Referring now to FIG. 3A, a relational view illustrating operation and interaction of the application(s) 190 and the data abstract model interface 122 of FIG. 2 is shown. The abstract model interface 122 illustratively provides an interface to the data abstraction model 124 and the runtime component 126 of FIGS. 2-3A.

The data abstraction model 124 defines logical fields corresponding to physical entities of data in the database 130, thereby providing a logical representation of the data. In a relational database environment having a multiplicity of database tables, a specific logical representation having specific logical fields can be provided for each database table. In this case, all specific logical representations together constitute the data abstraction model 124. The physical entities of the data are arranged in the database 130 according to a physical representation of the data. By way of illustration, two physical representations are shown, an XML data representation $214_1$ and a relational data representation $214_2$. However, the physical representation $214_N$ indicates that any other physical representation, known or unknown, is contemplated.

In one embodiment, a different single data abstraction model is provided for each separate physical representation $214_{1, 2, \ldots, N}$, as explained above for the case of a relational database environment. In an alternative embodiment, a single data abstraction model 124 contains field specifications (with associated access methods) for two or more physical representations $214_{1, 2, \ldots, N}$.

Figure 3B:
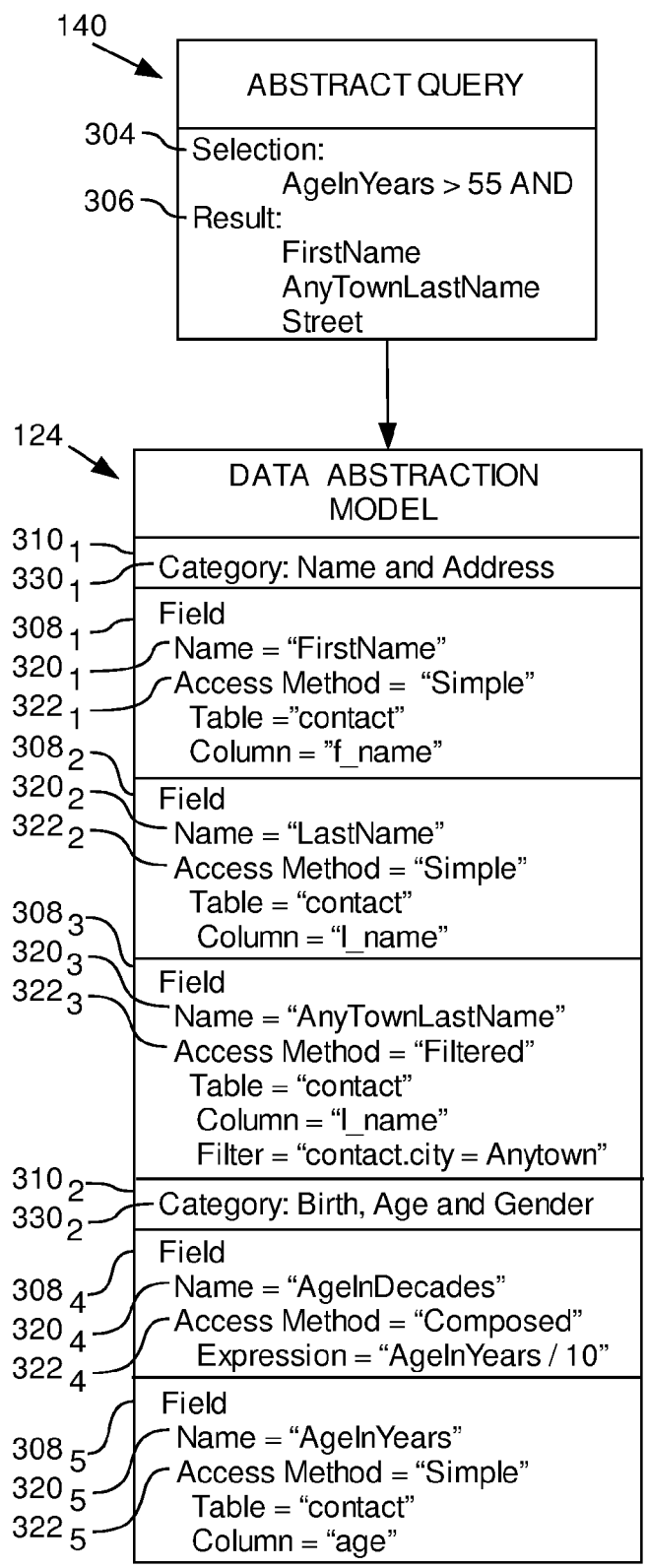
Figure 3C:
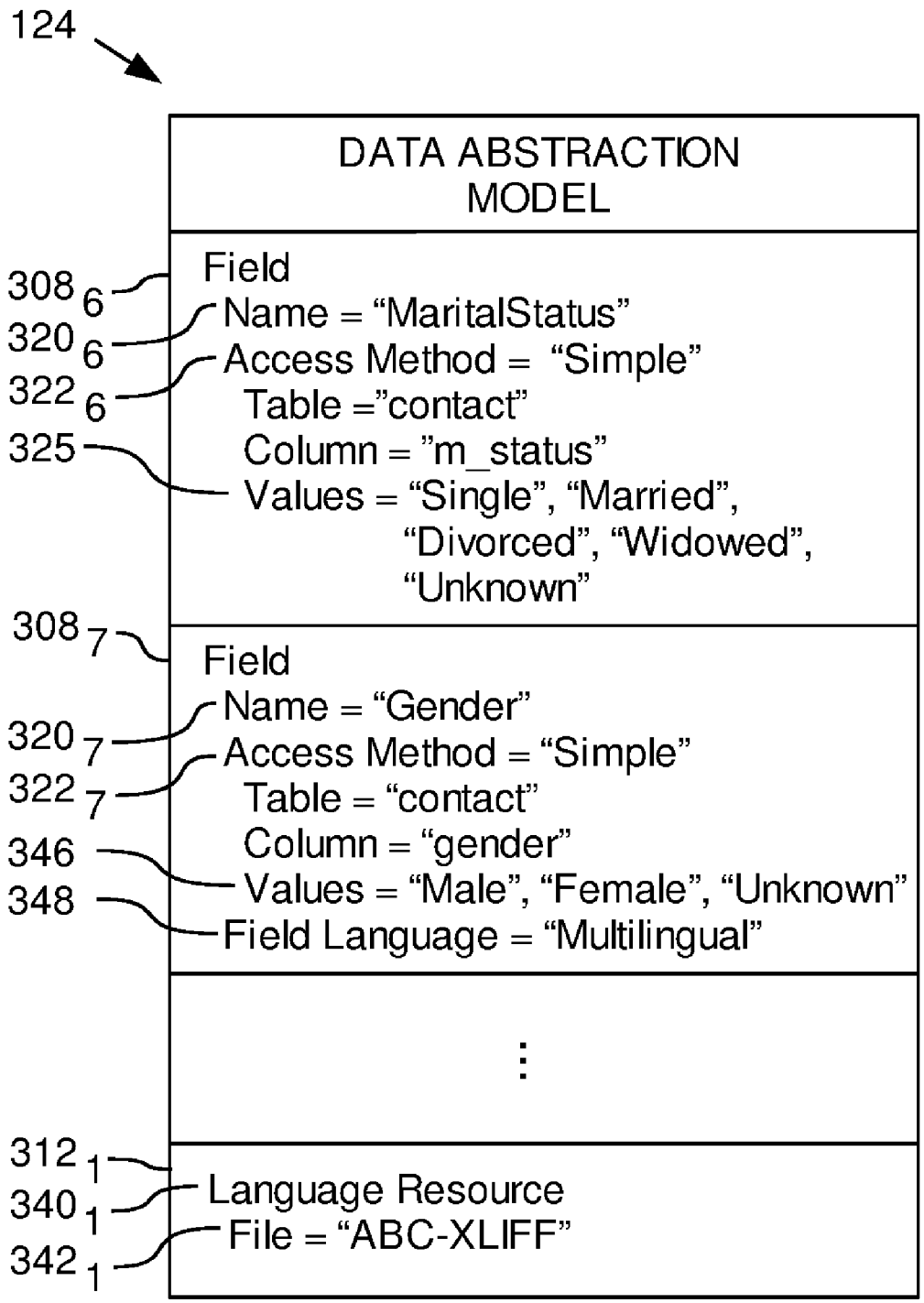

Using a logical representation of the data, the application query specification 192 of FIG. 2 specifies one or more logical fields to compose the abstract query 140 of FIG. 2. A requesting entity (e.g., the application 190) issues the abstract query 140 as defined by the application query specification 192. In one embodiment, the abstract query 140 may include both criteria used for data selection and an explicit specification of result fields to be returned based on the data selection criteria. An example of the selection criteria and the result field specification of the abstract query 140 is shown in FIGS. 3B-C. Accordingly, the abstract query 140 illustratively includes selection criteria 304 and a results specification 306.

The abstract query 140 is generally referred to herein as an "abstract query" because the query is composed according to abstract (i.e., logical) fields rather than by direct reference to the underlying physical data entities in the database 130. As a result, abstract queries may be defined that are independent of the particular underlying physical data representation used. For execution, the abstract query 140 is transformed into a concrete query consistent with the underlying physical representation of the data using the data abstraction model 124.

In general, the data abstraction model 124 exposes information as a set of logical fields that may be used within an abstract query to specify criteria for data selection and specify the form of result data returned from a query operation. The logical fields are defined independently of the underlying physical representation being used in the database 130, thereby allowing abstract queries to be formed that are loosely coupled to the underlying physical representation.

Referring now to FIG. 3B, a relational view illustrating interaction of the abstract query 140 and the data abstraction model 124 is shown. In one embodiment, the data abstraction model 124 comprises a plurality of field specifications $308_1$, $308_2$, $308_3$, $308_4$, $308_5$, $308_6$ and $308_7$ (seven shown by way of example), collectively referred to as the field specifications 308 (also referred to as hereinafter as "field definitions"). Specifically, a field specification is provided for each logical field available for composition of an abstract query. Each field specification may contain one or more attributes. Illustratively, the field specifications 308 include a logical field name attribute $320_1$, $320_2$, $320_3$, $320_4$, $320_5$, $320_6$ and $320_7$ (collectively, field name 320) and an associated access method attribute $322_1$, $322_2$, $322_3$, $322_4$, $322_5$, $322_6$ and $322_7$ (collectively, access methods 322). Each attribute may have a value. For example, logical field name attribute $320_1$ has the value "FirstName" and access method attribute $322_1$ has the value "Simple". Furthermore, each attribute may include one or more associated abstract properties. Each abstract property describes a characteristic of a data structure and has an associated value. In the context of the invention, a data structure refers to a part of the underlying physical representation that is defined by one or more physical entities of the data corresponding to the logical fields. In particular, an abstract property may represent data location metadata abstractly describing a location of a physical data entity corresponding to the data structure, like a name of a database table or a name of a column in a database table. Illustratively, the access method attribute $322_1$ includes data location metadata "Table" and "Column". Furthermore, data location metadata "Table" has the value "contact" and data location metadata "Column" has the value "f_name". Accordingly, assuming an underlying relational database schema in the present example, the values of data location metadata "Table" and "Column" point to a table "contact" having a column "f_name".

In one embodiment, each field specification 308 may contain a definition of one or more value constraints that define allowable values for the respective logical field. By way of example, the field specifications $308_6$ and $308_7$ include exemplary list definitions.

Illustratively, the field specification $308_6$ includes a list definition 325 that enumerates allowable values for associated marital status data. By way of example, the list definition 325 defines "Single", "Married", "Divorced", "Widowed"

and "Unknown" as allowable values for data that is associated with the "MaritalStatus" field $308_6$. The field specification $308_7$ illustratively includes a list definition 346 that enumerates allowable values for associated gender data. By way of example, the list definition 346 defines "Male", "Female" and "Unknown" as allowable values for data that is associated with the "Gender" field $308_7$.

It should be noted that the illustrated list definitions are merely illustrative for value constraint definitions and not limiting of the invention. For instance, in one embodiment a given field specification may include a limitation definition that defines an allowable range of values for associated data. By way of example, assume a logical field having associated Hemoglobin values and a limitation definition that defines "0" as minimum allowable value and "100" as maximum allowable value for data that is associated with the field. In another embodiment, a given field specification may include a classification definition that defines value classes for values of associated data. For instance, assume a logical field having associated age values and a classification definition that defines four different value classes "Class 1" to "Class 4". By way of example, age values from "0" to "12" can be associated with "Class 1" that can be referred to as the "Child" class. Age values from "13" to "17" are can be associated with "Class 2" that can be referred to as the "Adolescent" class, age values from "18" to "64" with "Class 3" that can be referred to as the "Adult" class, and age values from "65" to "120" with "Class 4" that can be referred to as the "Senior" class. Accordingly, any possible value constraint definitions are broadly contemplated.

Furthermore, the illustrated value constraint definitions can be adapted to user- and/or application-specific requirements. By way of example, for execution of a given query a user may define an upper and a lower limit of normal for the limitation definition of the Hemoglobin values. More specifically, the user may input corresponding upper and/or lower limits of normal lying within the defined minimum and maximum allowable values prior to query execution to customize the limitation definition. For instance, assume that the user defines for the Hemoglobin values a lower limit of normal as "15" and an upper limit as "25". Thus, all Hemoglobin values of a corresponding query result returned in execution of the given query lying inside the lower and upper limits of normal could be considered as "normal" values. Values below the lower limit of normal could be considered as "low" and values above the upper limit of normal could be considered as "high". Accordingly, all such possible implementations are broadly contemplated.

In one embodiment, the field specification 308 of each logical field may contain an attribute indicating whether data in the database 130 that is associated with the logical field can be defined in one or more different natural languages. By way of example, the field specification $308_7$ includes an exemplary "Field Language" attribute 348. Illustratively, the "Field Language" attribute 348 has the value "Multilingual" in order to indicate that different physical values defining data in the "gender" column of the "contact" table (cp. access method $322_7$) in the database 130 can be defined in different natural languages.

However, it should be noted that provision of an attribute indicating whether data associated with a given logical field can be defined in one or more different natural languages in the database 130 is merely optional. For instance, assume that in the given example physical values in the "m_status" column of the "contact" table (cp. access method $322_6$) in the database 130 that are associated with the "MaritalStatus" field $308_6$ may also be defined in more than one natural language. However, the field specification $308_6$ does not include a "Field Language" attribute. Accordingly, all such different implementations are broadly contemplated.

In one embodiment, groups (i.e. two or more) of logical fields may be part of categories. Accordingly, the data abstraction model 124 includes a plurality of category specifications $310_1$ and $310_2$ (two shown by way of example), collectively referred to as the category specifications. In one embodiment, a category specification is provided for each logical grouping of two or more logical fields. For example, logical fields $308_{1-3}$ and $308_{4-7}$ are part of the category specifications $310_1$ and $310_2$, respectively. A category specification is also referred to herein simply as a "category". The categories are distinguished according to a category name, e.g., category names $330_1$ and $330_2$ (collectively, category name(s) 330). In the present illustration, the logical fields $308_{1-3}$ are part of the "Name and Address" category and logical fields $308_{4-7}$ are part of the "Birth, Age and Gender" category.

The access methods 322 generally associate (i.e., map) the logical field names to data in the database (e.g., database 130). Any number of access methods is contemplated depending upon the number of different types of logical fields to be supported. In one embodiment, access methods for simple fields, filtered fields and composed fields are provided. The field specifications $308_1$, $308_2$ and $308_5$ exemplify simple field access methods $322_1$, $322_2$, and $322_5$, respectively. Simple fields are mapped directly to a particular entity in the underlying physical representation (e.g., a field mapped to a given database table and column). By way of illustration, as described above, the simple field access method $322_1$ shown in FIG. 3B maps the logical field name $320_1$ ("FirstName") to a column named "f_name" in a table named "contact". The field specification $308_3$ exemplifies a filtered field access method $322_3$. Filtered fields identify an associated physical entity and provide filters used to define a particular subset of items within the physical representation. An example is provided in FIG. 3B in which the filtered field access method $322_3$ maps the logical field name $320_3$ ("AnyTownLastName") to a physical entity in a column named "l_name" in a table named "contact" and defines a filter for individuals in the city of "Anytown". Another example of a filtered field is a New York ZIP code field that maps to the physical representation of ZIP codes and restricts the data only to those ZIP codes defined for the state of New York. The field specification $308_4$ exemplifies a composed field access method $322_4$. Composed access methods compute a logical field from one or more physical fields using an expression supplied as part of the access method definition. In this way, information which does not exist in the underlying physical data representation may be computed. In the example illustrated in FIG. 3B the composed field access method $322_4$ maps the logical field name $320_4$ "AgeInDecades" to "AgeInYears/10". Another example is a sales tax field that is composed by multiplying a sales price field by a sales tax rate.

It is contemplated that the formats for any given data type (e.g., dates, decimal numbers, etc.) of the underlying data may vary. Accordingly, in one embodiment, the field specifications 308 include a type attribute which reflects the format of the underlying data. However, in another embodiment, the data format of the field specifications 308 is different from the associated underlying physical data, in which case a conversion of the underlying physical data into the format of the logical field is required.

By way of example, the field specifications 308 of the data abstraction model 124 shown in FIGS. 3B-C are representative of logical fields mapped to data represented in the relational data representation $214_2$ shown in FIG. 3A. However, other instances of the data abstraction model 124 map logical fields to other physical representations, such as XML.

An illustrative abstract query corresponding to the abstract query 140 shown in FIG. 3B is shown in Table I below. By way of illustration, the illustrative abstract query is defined using XML. However, any other language may be used to advantage.

TABLE I

ABSTRACT QUERY EXAMPLE

```
001    <?xml version="1.0"?>
002    <!--Query string representation: (AgeInYears > "55"-->
003    <QueryAbstraction>
004      <Selection>
005        <Condition field="AgeInYears" operator="GT" value="55"
006                       internalID="1"/>
007      </Selection>
008      <Results>
009        <Field name="FirstName"/>
010        <Field name="AnyTownLastName"/>
011        <Field name="Street"/>
012      </Results>
013    </QueryAbstraction>
```

Illustratively, the abstract query shown in Table I includes a selection specification (lines 004-007) containing selection criteria and a results specification (lines 008-012). In one embodiment, a selection criterion consists of a field name (for a logical field), a comparison operator (=, >, <, etc) and a value expression (what is the field being compared to). In one embodiment, the results specification is a list of abstract fields that are to be returned as a result of query execution. A results specification in the abstract query may consist of a field name and sort criteria.

In one embodiment, the abstract query shown in Table I is constructed by an application (e.g., application 190 of FIG. 2). Furthermore, a language resource component (e.g., language resource component 150 of FIG. 2) is provided which is associated with the data abstraction model 124. The language resource component can be adapted, for instance, to translate elements (e.g., logical field names, values, etc.) of the data abstraction model 124 into the Russian language. Thus, the application may construct the abstract query using the translation of each element in the Russian language. An associated NLS manager (e. g., NLS manager 120 of FIG. 2) can generate an internal representation of the abstract query in a default or untranslated form, i.e., without using the Russian language translations. Thus, the internal representation can be used and accessed by the runtime component 126 for processing.

In one embodiment, the language resource component associated with the data abstraction model 124 (or at least a file defining a portion of the language resource component) is specified within the data abstraction model 124 itself. Accordingly, the data abstraction model 124 shown in FIGS. 3B-C includes a language resource specification $312_1$. The language resource specification $312_1$ includes a reference to a particular language resource component (e.g., language resource component 150 of FIG. 2, or a portion thereof) which is associated with the data abstraction model 124. Illustratively, the language resource specification $312_1$ includes a language resource file definition $340_1$ having an abstract attribute $342_1$ "File". By way of example, the language resource file definition $340_1$ indicates a corresponding language resource file name "ABC-XLIFF". Additional aspects of an illustrative "ABC-XLIFF" language resource file are described below.

An illustrative Data Abstraction Model (DAM) corresponding to the data abstraction model 124 shown in FIGS. 3B-C is shown in Table II below. By way of illustration, the illustrative data abstraction model is defined using XML. However, any other language may be used to advantage.

TABLE II

DATA ABSTRACTION MODEL EXAMPLE

```
001    <?xml version="1.0"?>
002    <DataAbstraction>
003    <Category name="Name and Address">
004      <Field queryable="Yes" name="FirstName" displayable="Yes">
005        <AccessMethod>
006          <Simple columnName="f_name"
                 tableName="contact"></Simple>
007        </AccessMethod>
008      </Field>
009      <Field queryable="Yes" name="LastName" displayable="Yes">
010        <AccessMethod>
011          <Simple columnName="l_name"
                 tableName="contact"></Simple>
012        </AccessMethod>
013      </Field>
014      <Field queryable="Yes" name="AnyTownLastName"
             displayable="Yes">
015        <AccessMethod>
016          <Filter columnName="l_name" tableName="contact"
017              Filter="contact.city=Anytown"> </Filter>
018        </AccessMethod>
019      </Field>
020    </Category>
021    <Category name="Birth, Age and Gender">
022      <Field queryable="Yes" name="AgeInDecades"
             displayable="Yes">
023        <AccessMethod>
024          <Composed
025              Expression="field:AgeInYears/10"> </Composed>
026        </AccessMethod>
027      </Field>
028      <Field queryable="Yes" name="AgeInYears"
             displayable="Yes">
029        <AccessMethod>
030          <Simple columnName="age"
                 tableName="contact"></Simple>
031        </AccessMethod>
032      </Field>
033      <Field queryable="Yes" name="MaritalStatus"
             displayable="Yes">
034        <AccessMethod>
035          <Simple columnName="m_status"
                 tableName="contact"></Simple>
036        </AccessMethod>
037        <List>
038          <Value val="Single" />
039          <Value val="Married" />
040          <Value val="Divorced" />
041          <Value val="Widowed" />
042          <Value val="Unknown" />
043        </List>
044      </Field>
045      <Field queryable="Yes" name="Gender" displayable="Yes"
046          multilingual = "Yes">
047        <AccessMethod>
048          <Simple columnName="gender"
                 tableName="contact"></Simple>
049        </AccessMethod>
050        <List>
051          <Value val="Female" />
052          <Value val="Male" />
053          <Value val="Unknown" />
054        </List>
055      </Field>
056    </Category>
057    <LanguageResource file="ABC-XLIFF.xml">
058    </DataAbstraction>
```

By way of example, note that lines 004-008 correspond to the first field specification $308_1$ of the DAM 124 shown in FIGS. 3B-C and lines 009-013 correspond to the second field specification $308_2$. The other field specifications of FIGS. 3B-C are shown in headlines 014-019, 022-027, 028-032, 033-044 and 045-055. Note that line 046 defines a "multilingual" attribute ("multilingual="Yes") that corresponds to the "Multilingual" attribute 348 shown in FIGS. 3B-C. Furthermore, note that line 057 corresponds to the language resource file definition $340_1$ of the DAM shown in FIGS. 3B-C. More specifically, line 057 includes a reference to an exemplary "ABC-XLIFF.xml" language resource file. In one embodiment, the ABC-XLIFF.xml file defines a default file containing default natural language expressions for a plurality of elements of the data abstraction model 124. One or more additional language resource files may then be loaded and applied to the default file to define a particular view of the data abstraction model 124. Determination of an appropriate language resource file and loading of one or more language resource files associated with a data abstraction model can be performed using conventional techniques applied to the data abstraction model. Examples of determination and loading are explained in more detail below with reference to FIGS. 6-10.

As was noted above, the abstract query of Table I can be transformed into a concrete query for query execution. An exemplary method for transforming an abstract query into a concrete query is described below with reference to FIGS. 4-5.

Transforming an Abstract Query into a Concrete Query

Figure 4:
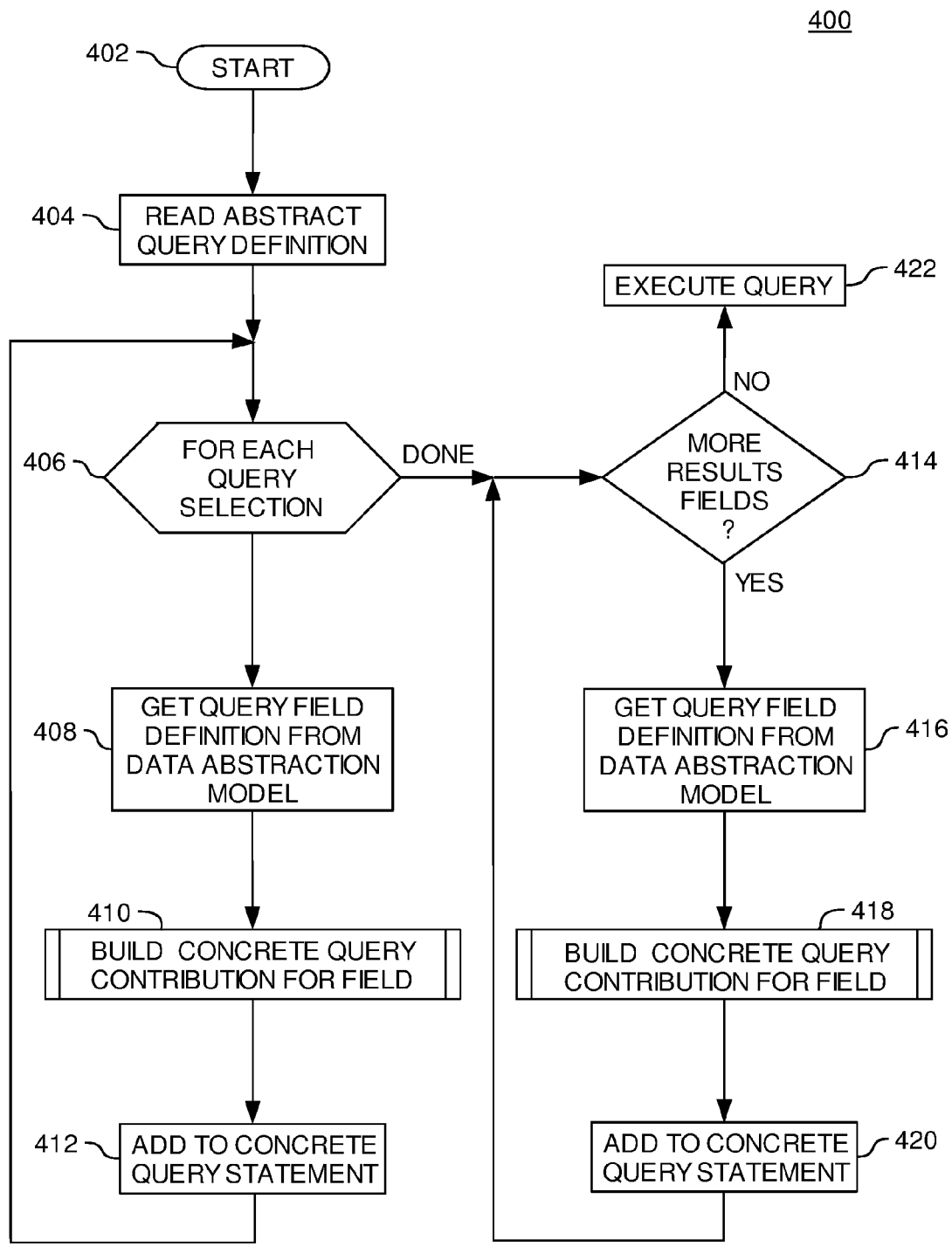
FIGS. 4-5 are flow charts illustrating the operation of a runtime component in one embodiment.

Referring now to FIG. 4, an illustrative runtime method 400 exemplifying one embodiment of the operation of the runtime component 126 of FIGS. 2-3 in conjunction with the data abstraction model 124 of FIGS. 2-3 is shown. The method 400 is entered at step 402 when the runtime component 126 receives as input an abstract query (such as the abstract query shown in Table I). At step 404, the runtime component 126 reads and parses the abstract query and locates individual selection criteria and desired result fields. At step 406, the runtime component 126 enters a loop (comprising steps 406, 408, 410 and 412) for processing each query selection criteria statement present in the abstract query, thereby building a data selection portion of a concrete query. In one embodiment, a selection criterion consists of a field name (for a logical field), a comparison operator (=, >, <, etc) and a value expression (what is the field being compared to). At step 408, the runtime component 126 uses the field name from a selection criterion of the abstract query to look up the definition of the field in the data abstraction model 124. As noted above, the field definition includes a definition of the access method used to access the physical data associated with the field. The runtime component 126 then builds (step 410) a concrete query contribution for the logical field being processed. As defined herein, a concrete query contribution is a portion of a concrete query that is used to perform data selection based on the current logical field. A concrete query is a query represented in languages like SQL and XML Query and is consistent with the data of a given physical data repository (e.g., a relational database or XML repository). Accordingly, the concrete query is used to locate and retrieve data from the physical data repository, represented by the database 130 shown in FIG. 3A. The concrete query contribution generated for the current field is then added to a concrete query statement. The method 400 then returns to step 406 to begin processing for the next field of the abstract query. Accordingly, the process entered at step 406 is iterated for each data selection field in the abstract query, thereby contributing additional content to the eventual query to be performed.

After building the data selection portion of the concrete query, the runtime component 126 identifies the information to be returned as a result of query execution. As described above, in one embodiment, the abstract query defines a list of abstract fields that are to be returned as a result of query execution, referred to herein as a results specification. A results specification in the abstract query may consist of a field name and sort criteria. Accordingly, the method 400 enters a loop at step 414 (defined by steps 414, 416, 418 and 420) to add result field definitions to the concrete query being generated. At step 416, the runtime component 126 looks up a result field name (from the results specification of the abstract query) in the data abstraction model 124 and then retrieves a result field definition from the data abstraction model 124 to identify the physical location of data to be returned for the current logical result field. The runtime component 126 then builds (at step 418) a concrete query contribution (of the concrete query that identifies physical location of data to be returned) for the logical result field. At step 420, the concrete query contribution is then added to the concrete query statement. Once each of the result specifications in the abstract query has been processed, the concrete query is executed at step 422.

Figure 5:
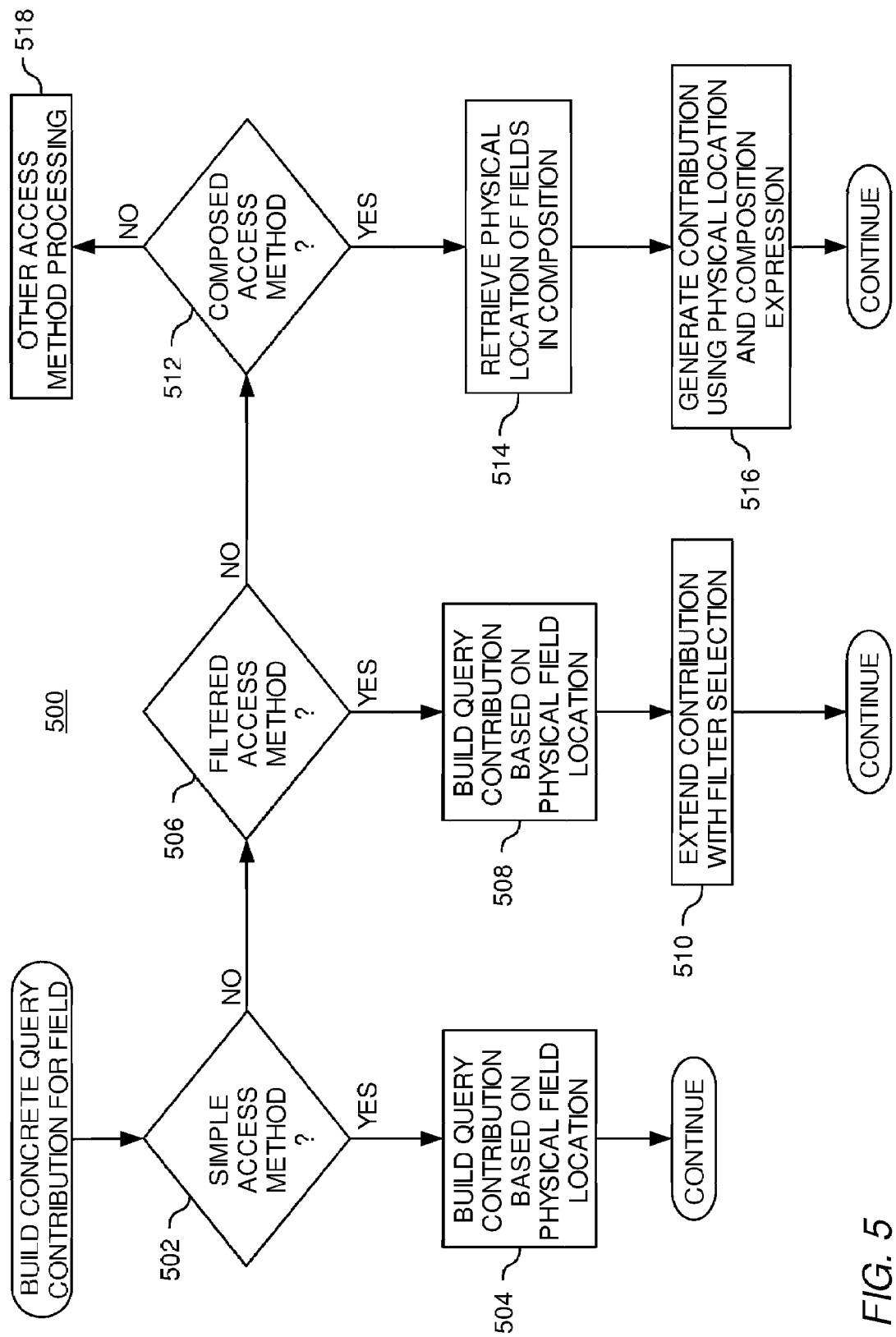

One embodiment of a method 500 for building a concrete query contribution for a logical field according to steps 410 and 418 of FIG. 4 is described with reference to FIG. 5. At step 502, the method 500 queries whether the access method associated with the current logical field is a simple access method. If so, the concrete query contribution is built (step 504) based on physical data location information and processing then continues according to method 400 described above. Otherwise, processing continues to step 506 to query whether the access method associated with the current logical field is a filtered access method. If so, the concrete query contribution is built (step 508) based on physical data location information for some physical data entity. At step 510, the concrete query contribution is extended with additional logic (filter selection) used to subset data associated with the physical data entity. Processing then continues according to method 400 described above.

If the access method is not a filtered access method, processing proceeds from step 506 to step 512 where the method 500 queries whether the access method is a composed access method. If the access method is a composed access method, the physical data location for each sub-field reference in the composed field expression is located and retrieved at step 514. At step 516, the physical field location information of the composed field expression is substituted for the logical field references of the composed field expression, whereby the concrete query contribution is generated. Processing then continues according to method 400 described above.

If the access method is not a composed access method, processing proceeds from step 512 to step 518. Step 518 is representative of any other access methods types contemplated as embodiments of the present invention. However, it should be understood that embodiments are contemplated in which less than all the available access methods are implemented. For example, in a particular embodiment only simple access methods are used. In another embodiment, only simple access methods and filtered access methods are used.

Natural Language Support in Creation of Abstract Queries

Figure 6:
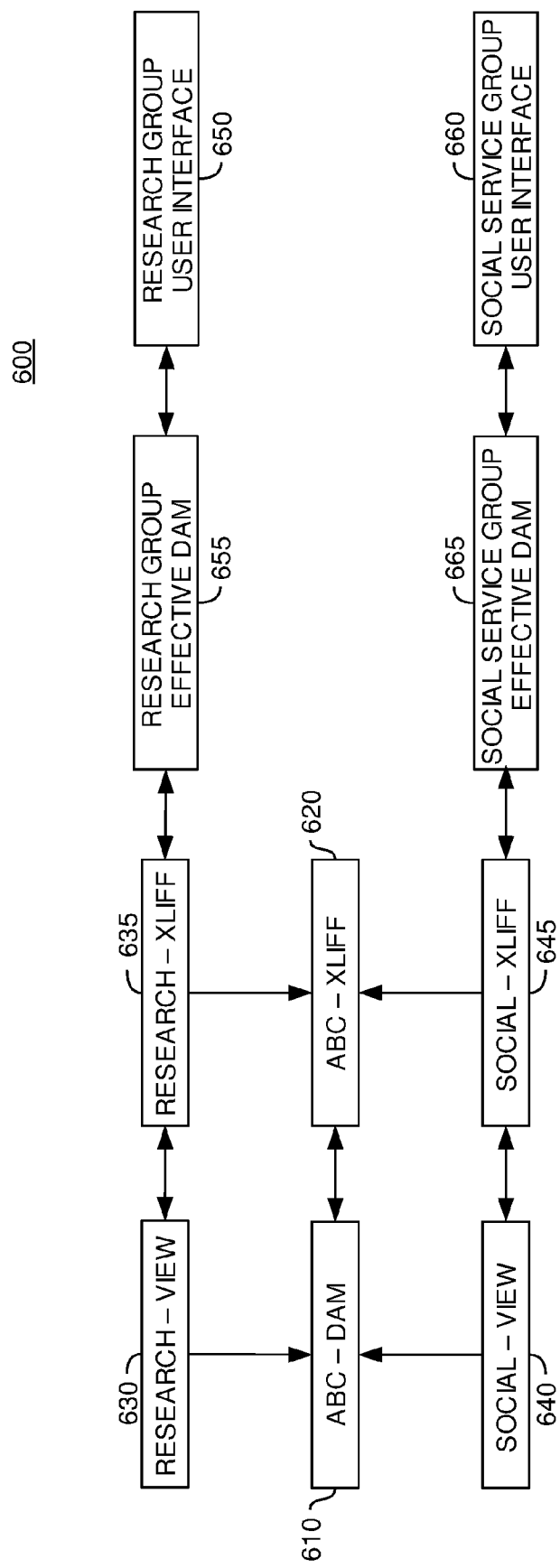
FIG. 6 is a relational view of software components in one embodiment.

Referring now to FIG. 6, a relational view illustrating natural language support for a data abstraction model in accordance with an associated language resource component in one embodiment is shown. More specifically, FIG. 6 shows a data abstraction model "ABC-DAM" 610 (e.g., data abstraction model 124 of FIG. 2) and two different views of the data abstraction model 610. In general, a view of the data abstraction model 610 defines how the data abstraction model 610 is presented to a user. For example, the view may reflect group security settings for a specific group of users. Accordingly, using different views of the data abstraction model 610 according to group security settings, users can be authorized to access information in the data abstraction model 610 based on a corresponding security level assigned to their respective user group. For simplicity, only two views are shown, i.e., a "RESEARCH-VIEW" 630 and a "SOCIAL-VIEW" 640. By way of example, the "RESEARCH-VIEW" 630 defines a view of the data abstraction model 610 for users in a research group and the "SOCIAL-VIEW" 640 defines a view for users in a social service group.

Illustratively, the data abstraction model 610 is associated with a language resource component "ABC-XLIFF" 620. The views 630 and 640 are associated with language resource components "RESEARCH-XLIFF" 635 and "SOCIAL-XLIFF" 645, respectively. In one embodiment, the language resource components 620, 635 and 645 are XLIFF resources. XLIFF (XML Localization Interchange File Format) is an XML based open format designed to capture localizable information (i.e., resources) and to operate with translation tools. Accordingly, the language resource components 620, 635 and 645 can be implemented by XLIFF language resource files (referred to herein as language resource files).

In one embodiment, the language resource file 620 is a default language resource file that includes default natural language expressions for each logical field defined by the data abstraction model 610. In other words, the default language resource file includes all natural language expressions as defined in the data abstraction model 610. However, it should be noted that provision of the default language resource file is optional. Instead of using the default language resource file, all default natural language expressions can be determined directly from the data abstraction model 610. Accordingly, in one embodiment, the language resource file 620 includes natural language expressions which describe translations of each logical field of the data abstraction model 610 into another language or a variation on the same language.

The language resource files 635 and 645 include translations of increasing specificity to replace relatively less specific translations of the language resource file 620. Each of the language resource files 635 and 645 can be used in combination with the language resource file 620 to translate natural language expressions in the data abstraction model 610 according to the views 630 and 640, respectively. Thus, by applying the view 630 and the language resource file 635 (in combination with the language resource file 620) to the data abstraction model 610, an effective data abstraction model "RESEARCH GROUP EFFECTIVE DAM" 655 can be created for a research group user using the "RESEARCH-VIEW" 630. An effective data abstraction model is an in-memory representation of a default data abstraction model (e.g., "ABC-DAM" 610) as modified by applying a view thereto and/or by aggregating multiple data abstraction models into a single larger data abstraction model. The effective data abstraction model 655 can be displayed in a user interface 650. Thus, the user interface 650 is displayed in accordance with the natural language expressions defined by the language resource files 620 and 635. Accordingly, for a social service group user using the "SOCIAL-VIEW" 640, an effective data abstraction model "SOCIAL SERVICE GROUP EFFECTIVE DAM" 665 can be created and displayed in a user interface 660. Thus, the user interface 660 is displayed in accordance with the natural language expressions defined by the language resource files 620 and 645. The data abstraction model 610, the views 630 and 640, the associated language resource files 620, 635 and 645, the effective data abstraction models 655 and 665 and the user interfaces 650 and 660 are explained in more detail below with respect to Tables III-X.

As an example of the data abstraction model "ABC-DAM" 610, the exemplary data abstraction model "ABC-DAM.xml" shown in Table III below is illustrated. For simplicity, elements of the "ABC-DAM.xml" data abstraction model are represented in a shorthand format. Persons skilled in the art will readily recognize corresponding XML representations. Further, for brevity, only parts that are relevant for the following explanations are shown. It is noted that this manner of presentation applies to other tables described below as well.

TABLE III

DATA ABSTRACTION MODEL EXAMPLE

```
001   ABC-DAM.xml
002     +---> Demographic: Patient demographic information
003       +--> Gender
004         +-->Value: = "Female"
005         +-->Value: = "Male"
006         +-->Value: = "Unknown"
007       +--> Name
008       +--> SSN: This is the patient's social security number
009     +---> Diagnosis: Patient diagnostic information
010       +--> Disease
011         +--> Name
012     +--->Language Resource
013       +--> ABC-XLIFF.xml
```

As can be seen from lines 002 and 009, the exemplary data abstraction model includes two categories, i.e., "Demographic" and "Diagnosis". By way of example, the "Demographic" category includes definitions for a "Gender" (lines 003-006), "Name" (line 007) and "SSN" (line 008) logical field. Assume now that the "Gender" field refers to a "gender" column in a table of an underlying database (e.g., database 130 of FIG. 2). Furthermore, as can be seen from lines 004-006 of Table III, the definition of the "Gender" field includes a list of allowed physical values in a default language, here English. More specifically, the allowed physical values for the "Gender" field are defined by default language expressions "Female", "Male" and "Unknown". It should further be noted that the "Diagnosis" category also includes a "Name" field (line 011). Furthermore, as can be seen from line 013, the exemplary data abstraction model of Table III is associated with the language resource file "ABC-XLIFF.xml". An exemplary language resource file exemplifying the language resource file "ABC-XLIFF" 620 is shown in Table IV below.

TABLE IV

ABC-XLIFF FILE EXAMPLE

```
001   ABC-XLIFF.xml
002     "Demographic.Gender:name" = "Gender"
003     "Demographic.Gender:val-Female" = "Female"
004     "Demographic.Gender:val-Male" = "Male"
005     "Demographic.Gender:val-Unknown" = "Unknown"
006     "Demographic.Name:name" = "Name"
007     "Demographic.SSN:description" = "This is the patient's social security number"
008     "Demographic.SSN:name" = "SSN"
009     "Demographic:description" = "Patient demographic information"
010     "Demographic:name" = "Demographic"
011     "Diagnosis.Disease.Name:name" = "Name"
012     "Diagnosis.Disease:name" = "Disease"
013     "Diagnosis:description" = "Patient diagnostic information"
014     "Diagnosis:name" = "Diagnosis"
```

The exemplary XLIFF language resource file of Table IV illustratively includes default natural language expressions for each attribute included in a logical field of the exemplary data abstraction model of Table Ill. More specifically, the exemplary XLIFF language resource file includes, on the left hand side of each line, a definition for an element (e.g., a logical field name or value) of the data abstraction model and, on the right hand side of each line, an associated value. In other words, the XLIFF language resource file of Table IV includes definition/value mappings for the data abstraction model of Table III. However, as already mentioned above, it should be noted that all information included in the exemplary default language resource file of Table IV is included in and can, thus, be retrieved from, the exemplary data abstraction model of Table III.

As an example of the "RESEARCH-VIEW" 630, an exemplary view of the data abstraction model of Table III for users of a research group is shown in Table V below. Further, for brevity, only parts that are relevant for the following explanations are shown.

TABLE V

RESEARCH-VIEW EXAMPLE

| | |
|---|---|
| 001 | RESEARCH-VIEW.xml |
| 002 | +---> Exclude |
| 003 |     +--> Field: SSN |
| 004 | +---> Language Resource |
| 005 |     +--> RESEARCH-XLIFF.xml |

By way of example, it is assumed that researchers should be prevented from seeing Social Security numbers (SSN) for security reasons. Accordingly, as can be seen from line 002, the view of Table V includes an "Exclude" attribute to exclude the logical field "SSN" (line 003) from the presentation of the data abstraction model 610 for display. In other words, the exemplary RESEARCH-VIEW is configured to implement group security settings for users of the RESEARCH group. Furthermore, as can be seen from line 005, the exemplary view of Table V is associated with the language resource file "RESEARCH-XLIFF.xml". An exemplary language resource file exemplifying the language resource file "RESEARCH-XLIFF" 635 is shown in Table VI below.

TABLE VI

RESEARCH-XLIFF FILE EXAMPLE

| | |
|---|---|
| 001 | RESEARCH-XLIFF.xml |
| 002 | "Demographic.Name:name" = "Subject name" |
| 003 | "Demographic:description" = "Demographic" |
| 004 | "Diagnosis.Disease.Name:name" = "Syndrome name" |
| 005 | "Diagnosis:description" = "Diagnostic information" |

As can be seen from lines 002-005, natural language expressions for different definitions of the data abstraction model of Table III are provided, which replace corresponding natural language expressions of the language resource file of Table IV. In other words, it is assumed that researchers would prefer to view the data abstraction model of Table III according to a more technical terminology. Therefore, the natural language expressions shown in Table VI are intended to change the corresponding natural language expressions of Table IV according to a more technical terminology.

By applying the view of Table V and the language resource file of Table VI (in combination with the language resource file of Table IV) to the data abstraction model of Table III, an effective data abstraction model as illustrated in Table VII below can be generated for users of the research group and displayed in the user interface 650. The exemplary effective data abstraction model illustrated in Table VII is an example for the effective data abstraction model 655. For simplicity, only relevant displayed information is illustrated in Table VII.

TABLE VII

RESEARCH GROUP EFFECTIVE DAM EXAMPLE

| | |
|---|---|
| 001 | +---> Demographic: Demographic |
| 002 |   +--> Gender |
| 003 |     +-->Value: = "Female" |
| 004 |     +-->Value: = "Male" |
| 005 |     +-->Value: = "Unknown" |
| 006 |   +--> Subject name |
| 007 | +---> Diagnosis: Diagnostic information |
| 008 |   +--> Disease |
| 009 |     +--> Syndrome name |

As can be seen from Table VII, the SSN information of the data abstraction model of Table III has been excluded from display. Furthermore, lines 001, 006, 007 and 009 are displayed according to the natural language expressions of the language resource file of Table VI.

As an example of the "SOCIAL-VIEW" 640, an exemplary view of the data abstraction model of Table III for users of a social service group is shown in Table VIII below. Further, for brevity, only parts that are relevant for the following explanations are shown.

TABLE VIII

SOCIAL-VIEW EXAMPLE

| | |
|---|---|
| 001 | SOCIAL-VIEW.xml |
| 002 | +---> IncludeAll |
| 003 | +---> Language Resource |
| 004 |     +--> SOCIAL-XLIFF.xml |

By way of example, it is assumed that social service group users would need to access all information included in the "ABC-DAM" 610. Accordingly, as can be seen from line 002, the view of Table VIII includes an "IncludeAll" attribute to include all logical fields of the data abstraction model 610 for display. Furthermore, as can be seen from line 004, the exemplary view of Table VIII is associated with the language resource file "SOCIAL-XLIFF.xml". An exemplary language resource file exemplifying the language resource file "SOCIAL-XLIFF" 645 is shown in Table IX below.

TABLE IX

SOCIAL-XLIFF FILE EXAMPLE

| | |
|---|---|
| 001 | SOCIAL-XLIFF.xml |
| 002 | "Demographic.Gender:val-Female" = "Girl" |
| 003 | "Demographic.Gender:val-Male" = "Boy" |
| 004 | "Demographic.Gender:val-Unknown" = "Unlisted" |
| 005 | "Demographic.Name:name" = "Patient name" |
| 006 | "Diagnosis.Disease.Name:name" = "Sickness name" |
| 007 | "Diagnosis:name" = "Likely Illness" |

As can be seen from lines 002-007, natural language expressions for different definitions of the data abstraction model of Table III are provided, which replace corresponding natural language expressions of the language resource file of Table IV. More specifically, it is assumed that social service group users would need to view the data abstraction model of Table III according to a less technical terminology. Therefore, the natural language expressions shown in Table IX are intended to change the corresponding natural language expressions of Table IV accordingly.

According to the view of Table VIII and the language resource file of Table IX (in combination with the language resource file of Table IV), the effective data abstraction model of Table X below can be generated for users of the social service group and displayed in the user interface 660. The exemplary data abstraction model of Table X is an example for the effective data abstraction model 665. For simplicity, only relevant displayed information is illustrated in Table X.

TABLE X

SOCIAL SERVICE GROUP EFFECTIVE DAM EXAMPLE

```
001    +---> Demographic: Patient demographic information
002      +--> Gender
003         +-->Value: = "Girl"
004         +-->Value: = "Boy"
005         +-->Value: = "Unlisted"
006      +--> Patient name
007         +--> SSN: This is the patient's social security number
008    +---> Likely illness: Patient diagnostic information
009      +--> Disease
010         +--> Sickness name
```

As can be seen from Table X, all information of the data abstraction model of Table III has been included for display. Furthermore, lines 003-006, 008 and 010 are displayed according to the natural language expressions of the language resource file of Table IX.

Figure 7:
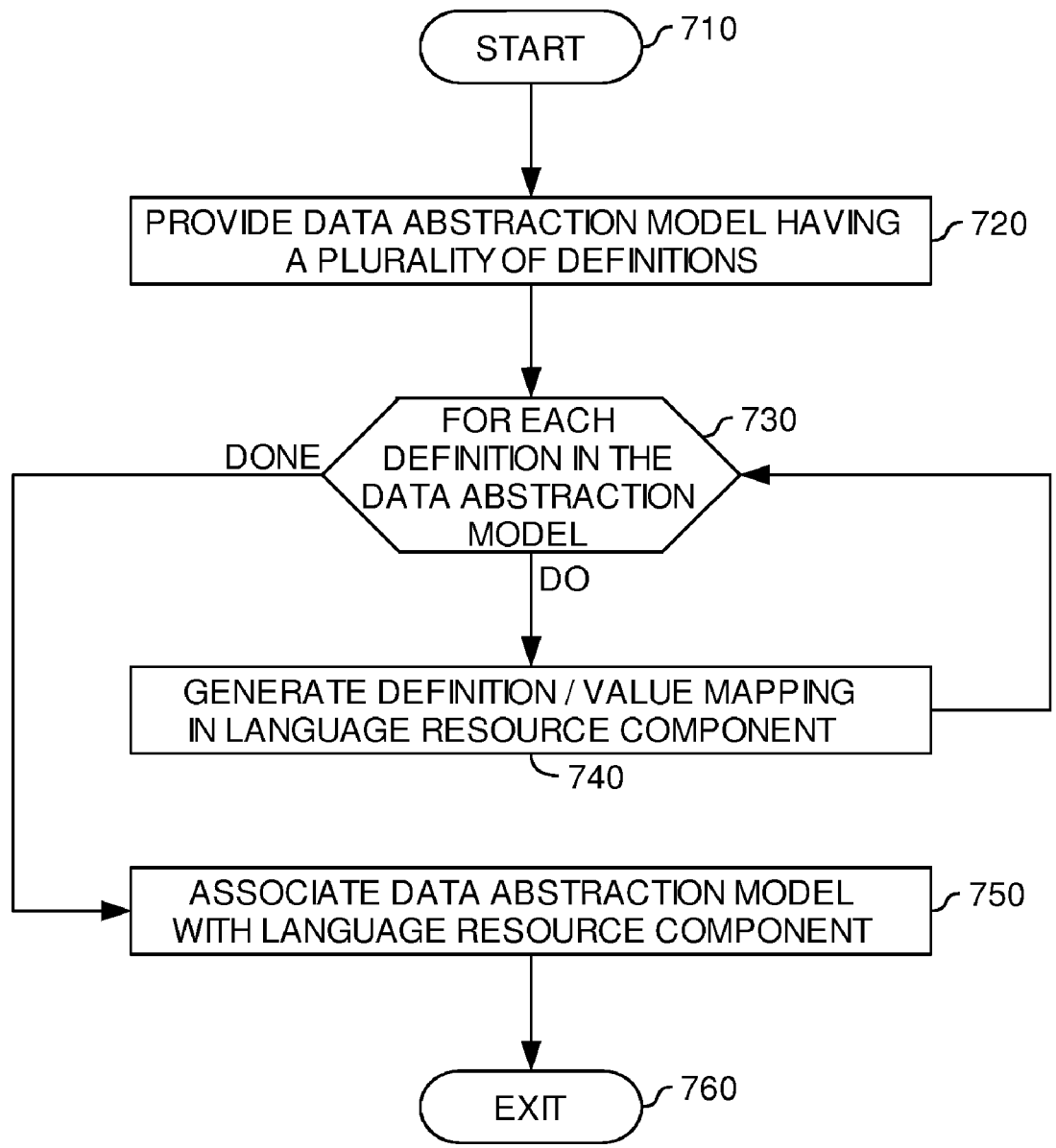
FIGS. 7-9 are flow charts illustrating a method of providing natural language support in a database environment in one embodiment.

Referring now to FIG. 7, a method 700 for providing natural language support for users running queries (e.g., abstract query 140 of FIG. 2) against a database (e.g., database 130 of FIG. 2) is illustrated. In one embodiment, the method 700 is performed by the NLS manager 120 of FIG. 2. Method 700 starts at step 710.

At step 720, a data abstraction model (e. g., data abstraction model 610 of FIG. 6) including a plurality of logical fields abstractly describing physical data residing in the database is retrieved. Each logical field includes one or more attributes. For each attribute, a corresponding definition that uniquely identifies the attribute can be determined from the data abstraction model. At step 730, each definition in the data abstraction model is determined and, at step 740, a corresponding definition/value mapping is generated in a language resource component (e.g., natural language resource component 150 of FIG. 2).

By way of example, for the attribute "Name" in line 007 of the exemplary "ABC-DAM" of Table III, a definition "Demographic.Name:name" is determined. For the attribute "Name" in line 011, a definition "Diagnosis.Disease.Name:name" is determined. Both definitions are mapped to the natural language expression or value "Name" according to lines 007 and 011 of the exemplary "ABC-DAM" of Table III. Furthermore, both definition/value mappings are generated in the exemplary "ABC-XLIFF" language resource file of Table IV (lines 006 and 011, respectively).

The method 700 performs a loop consisting of steps 730 and 740 until a corresponding definition/value mapping has been generated in the language resource component for each definition in the data abstraction model. Thus, the language resource component defines a natural language expression for each of the plurality of logical fields. Subsequently, method 700 proceeds with step 750.

At step 750, the data abstraction model is associated with the generated language resource component. For instance, a language resource file definition is included in the data abstraction model, e. g., language resource file definition "ABC-XLIFF.xml" in line 013 of the exemplary "ABC-DAM" of Table III. Method 700 then exits at step 760.

Figure 8:
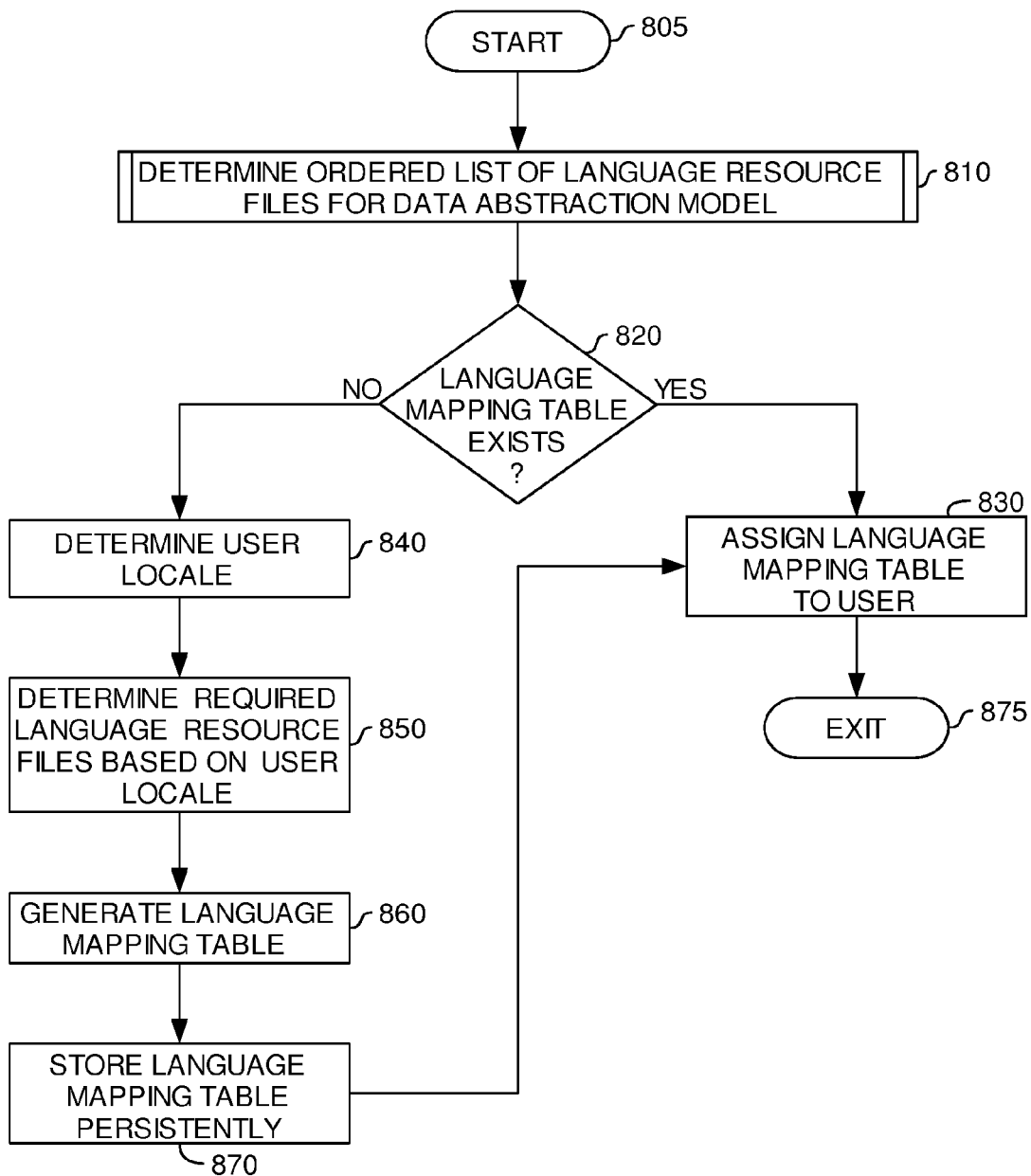

Referring now to FIG. 8, a method 800 illustrating determination of a language mapping table having suitable natural language expressions to be used for a given user is shown. The mapping table is determined from corresponding language resource components (e. g., language resource components 620, 635 and 645 of FIG. 6). By way of example, the method 800 is explained with reference to language resource files. In one embodiment, the method 800 is performed by the NLS manager 120 of FIG. 2. Method 800 starts at step 805.

At step 810, an ordered list of the language resource files for a given data abstraction model is determined. Determination of the ordered list is described in more detail below with reference to FIG. 9.

At step 820, a determination is made as to whether a corresponding language mapping table for the user already exists. If the corresponding language mapping table already exists, it is assigned to the user in step 830. Method 800 then exits at step 875. If the corresponding language mapping table does not exist, processing continues at step 840.

At step 840, a user locale is determined. The user locale defines settings concerning, for example, country, language and a language variant used by the user. For instance, the locale may define the user as a researcher of a research group who uses the English language in the United States. In one embodiment, the locale is determined according to user input including suitable parameters for determination of all required language resource files using a user interface. In another embodiment, the locale is determined according to local user settings on his/her workstation.

At step 850, all required language resource files are determined for the user based on the determined user locale. For purposes of illustration, it will be assumed that the language resource files of Tables IV and VI are determined for the researcher.

At step 860, using the determined language resource files, a language mapping table is generated for the user. To this end, in one embodiment all definition/value mappings of the least specific language resource file are included in the language mapping table. For instance, all definition/value mappings of the language resource file of Table IV are initially included in the language mapping table. Subsequently, definition/value mappings of more specific language resource files are used to replace the less specific definition/value mappings of less specific language resource files. This process is performed until all definition/value mappings in the most specific language resource file have been processed. For instance, in the given example, the less specific definition/value mappings from the language resource file of Table IV are replaced by more specific definition/value mappings of the language resource file of Table VI. Accordingly, for the researcher of the research group, the exemplary language mapping table according to Table XI below can be generated.

TABLE XI

MAPPING TABLE EXAMPLE

```
001    RESEARCH-MAPPING.xml
002       "Demographic.Gender:name" = "Gender"
003       "Demographic.Gender:val-Female" = "Female"
004       "Demographic.Gender:val-Male" = "Male"
005       "Demographic.Gender:val-Unknown" = "Unknown"
006       "Demographic.Name:name" = "Subject name"
007       "Demographic.SSN:description" = "This is the
          patient's social security number"
008       "Demographic.SSN:name" = "SSN"
```

TABLE XI-continued

MAPPING TABLE EXAMPLE

| | |
|---|---|
| 009 | "Demographic:description" = "Demographic" |
| 010 | "Demographic:name" = "Demographic" |
| 011 | "Diagnosis.Disease.Name:name" = "Syndrome name" |
| 012 | "Diagnosis.Disease:name" = "Disease" |
| 013 | "Diagnosis:description" = "Diagnostic information" |
| 014 | "Diagnosis:name" = "Diagnosis" |

As can be seen from Table XI, the exemplary language mapping table represents a combination of the language resource files of Tables IV and VI. The loading and processing of language resource files using locales for file or resource names for generation of a language mapping table is well-known in the art (e.g., by a Java® language runtime implementation of resource bundles) and will, therefore, not be described in more detail.

At step 870, the generated language mapping table is persistently stored in memory for use by all users having the same user locale. For instance, the language mapping table of Table XI is persistently stored for all users of the research group. Thus, each time a research group user loads the effective data abstraction model of the research group, the language mapping table can be used for translation purposes. Processing then continues at step 830 as described above.

Figure 9:
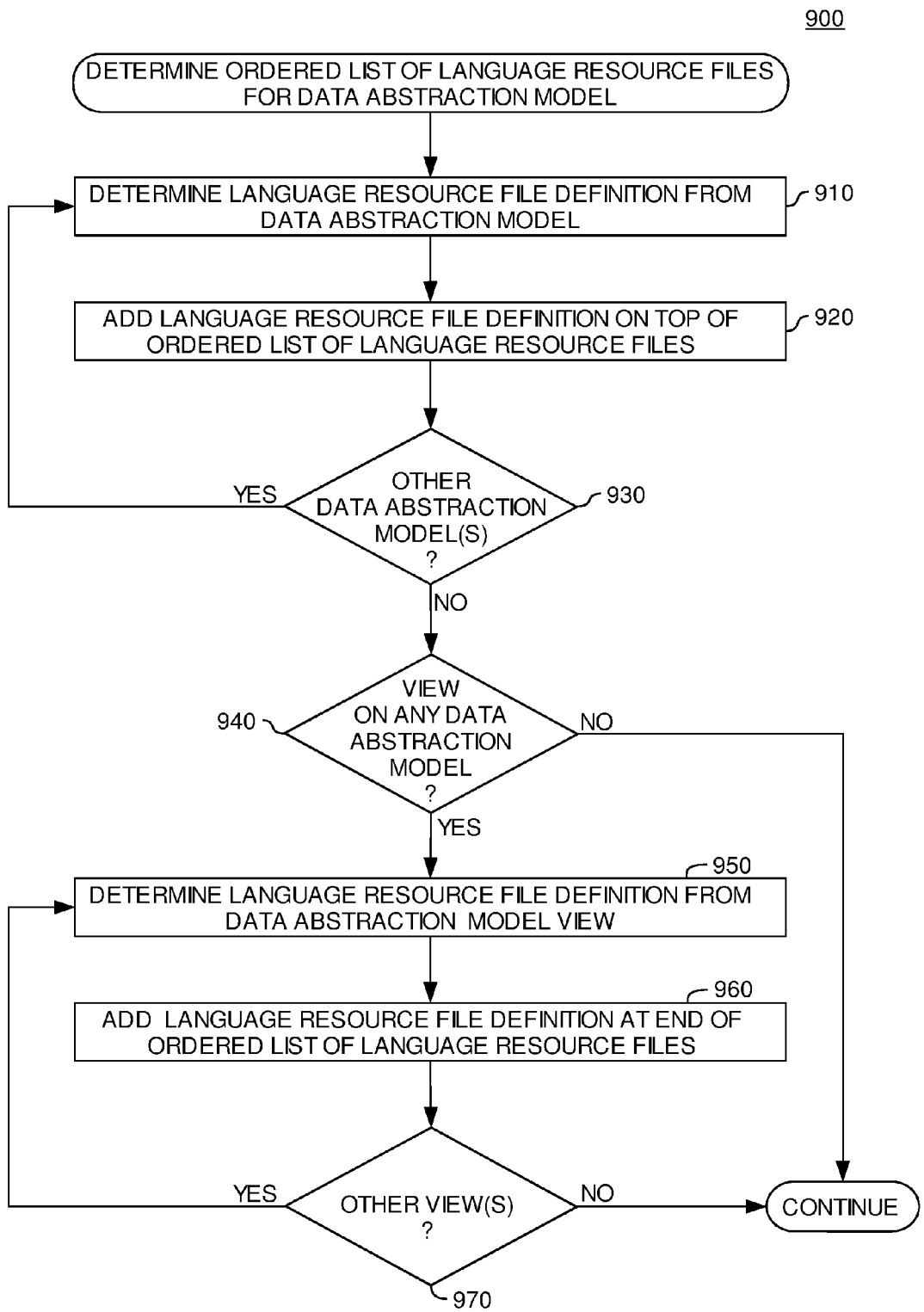

Referring now to FIG. 9, a method 900 illustrating the determination of the ordered list of the language resource files for a given data abstraction model (e. g., data abstraction model 610 of FIG. 6) according to step 810 of FIG. 8 is shown. In one embodiment, the ordered list is determined for all users of a given group having common group security settings. Method 900 starts at step 910.

At step 910, a language resource file definition is determined from the data abstraction model. For instance, the language resource file definition "ABC-XLIFF.xml" can be determined from the exemplary data abstraction model of Table III (line 013). At step 920, the determined language resource file definition is added on top of the ordered list of language resource files. At step 930, it is determined whether other data abstraction models exist. If one or more other data abstraction models exist, a next data abstraction model is selected and processing returns to step 910. Accordingly, steps 910 to 930 form a loop which is executed until all data abstraction models have been processed. By way of example, assume that another data abstraction model "DEF-DAM" having a language resource file definition "DEF-XLIFF.xml" exists. Accordingly, the language resource file definition "DEF-XLIFF.xml" is placed on top of the ordered list before the language resource file definition "ABC-XLIFF.xml". When it is determined, at step 930, that no more data abstraction models exist, processing continues at step 940.

At step 940, it is determined whether one or more views on one or more data abstraction models, which have been processed in the loop formed of steps 910 to 930, exist. If no view exists, processing continues at step 820 of FIG. 8. If, however, one or more views exist, a language resource file definition from a first view is determined at step 950. For instance, the language resource file definition "RESEARCH-XLIFF.xml" can be determined from the exemplary view of Table V (line 005). At step 960, the determined language resource file definition is added at the end of the ordered list. At step 970, it is determined whether other views exist. If one or more other views exist, a next view is selected and processing returns to step 950. Accordingly, steps 950 to 970 form a loop which is executed until all views have been processed.

In one embodiment, step 970 includes determining whether other views exist for a given group of users. For instance, it is determined whether other views exist for the research group users. In the given example no additional views for research group users can be determined, but a view for social service group users can be determined. By way of example, the "SOCIAL-VIEW" of Table VIII includes the language resource file definition "SOCIAL-XLIFF.xml" (line 004). However, in the given example it is assumed that the views of the research group and the social service group have different group security settings and are mutually exclusive. Therefore, the language resource file definition "SOCIAL-XLIFF.xml" is not processed. However, if the views of the research group and the social service group had been construed with common group security settings, the language resource file definition "SOCIAL-XLIFF.xml" would have been placed at the end of the ordered list behind the language resource file definition "RESEARCH-XLIFF.xml". When it is determined, at step 970, that no more views exist, processing continues at step 820 of FIG. 8.

In one embodiment, the loop formed of steps 950 to 970 is performed for views of different specificity levels. In other words, after processing a first view at a lowest specificity level, views of higher specificity levels up to views having the highest specificity level can be processed before a next view at the lowest specificity level is processed. It should be noted that identical processing can be performed for the data abstraction models by the loop formed of steps 910 to 930.

For instance, assume that a view for a Russian research group having a language resource file definition "RESEARCH-XLIFF_RU.xml" exists. Assume further that a view for a Russian research group of a region BB exists, which requires a more specific terminology and which has a language resource file definition "RESEARCH-XLIFF_RU_BB.xml". Accordingly, the language resource file definition "RESEARCH-XLIFF_RU.xml" would be processed after the language resource file definition "RESEARCH-XLIFF.xml", and the language resource file definition "RESEARCH-XLIFF_RU_BB.xml" would be processed at the end. Accordingly, the language resource file definition "RESEARCH-XLIFF_RU_BB.xml" would be placed at the end of the ordered list. The following Table XII exemplifies an ordered list according to the above example.

TABLE XII

ORDERED LIST EXAMPLE

| | |
|---|---|
| 001 | DEF-XLIFF.xml |
| 002 | DEF-XLIFF_RU.xml |
| 003 | DEF-XLIFF_RU_BB.xml |
| 004 | ABC-XLIFF.xml |
| 005 | ABC-XLIFF_RU.xml |
| 006 | ABC-XLIFF_RU_BB.xml |
| 007 | RESEARCH-XLIFF.xml |
| 008 | RESEARCH-XLIFF_RU.xml |
| 009 | RESEARCH-XLIFF_RU_BB.xml |

It should be noted that Table XII includes language resource file definitions for the data abstraction models "DEF-DAM" (lines 001-003) and "ABC-DAM" (lines 004-006) with specificity levels that correspond to the specificity levels of the "RESEARCH-VIEW" of Table V as explained above. In other words, it is assumed that a general Russian translation (lines 002 and 005) and a more specific Russian translation for a region BB (lines 003 and 006) are also provided for each of the data abstraction models "DEF-DAM" and "ABC-DAM".

Figure 10:
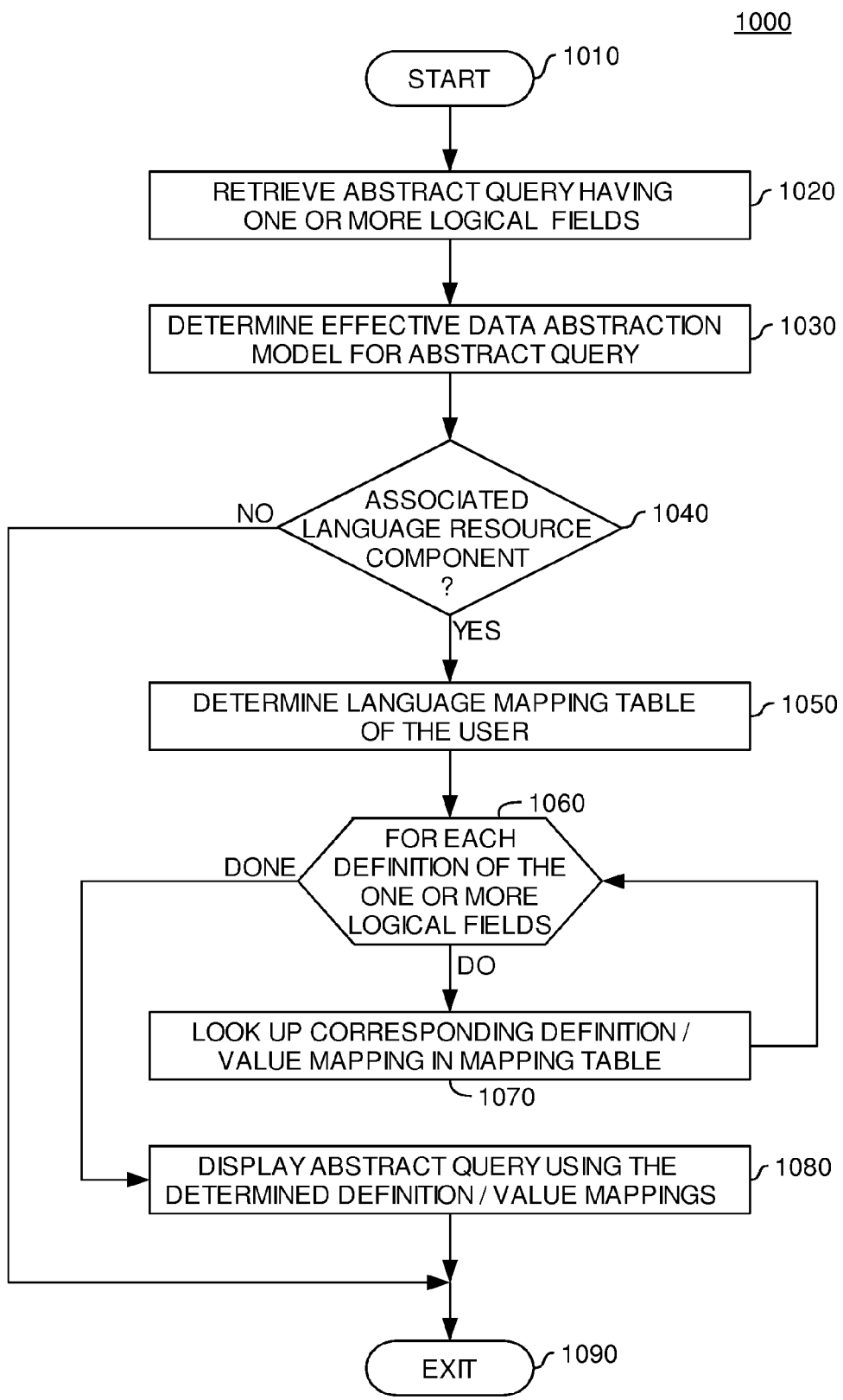
FIG. 10 is a flow chart illustrating a method of providing natural language support for users running queries against a database in one embodiment.

Referring now to FIG. 10, one embodiment of a method 1000 of providing natural language support for users running queries (e.g., abstract query 140 of FIG. 2) against a database (e.g., database 130 of FIG. 2) is illustrated. At least a portion of the steps of method 1000 can be performed by the NLS manager 120 of FIG. 2. Method 1000 starts at step 1010.

At step 1020, an abstract query (e. g., abstract query 140 of FIG. 2) including one or more logical fields, each corresponding to a logical field specification of a data abstraction model (e. g., data abstraction model 124 of FIG. 2 or data abstraction model 610 of FIG. 6) abstractly describing physical data residing in a database (e. g., database 130 of FIG. 2) is retrieved. At step 1030, the data abstraction model is determined. This determination can be performed by a database application (e. g., application 190 of FIG. 2) that is configured to access the data abstraction model and has corresponding knowledge of which data abstraction model(s) to use. Furthermore, based on security settings for users and user and group information for a corresponding user, applicable views can be determined by the application. At step 1040, it is determined, from the data abstraction model, whether an associated language resource component (e. g., language resource file 620 of FIG. 6) exists. If no associated language resource component exists, the method 1000 exits at step 1090. If, however, an associated language resource component exists, processing continues at step 1050.

At step 1050, a corresponding language mapping table is determined for the user. Determination of the language mapping table is performed, in one embodiment, according to the method 800 of FIG. 8. The method 1000 then enters a loop consisting of steps 1060 and 1070. The loop is performed for each attribute of each logical field of the abstract query to determine a natural language expression for the logical field(s) of the abstract query. More specifically, for each attribute of each logical field, a corresponding definition is determined at step 1060. Then, at step 1070, a corresponding definition/value mapping is looked up in the language mapping table. When all attributes have been processed, processing continues at step 1080.

At step 1080, the abstract query is displayed in the determined natural language expression. More specifically, each attribute in the abstract query is replaced by a determined value from a corresponding definition/value mapping from the language mapping table for display. Method 1000 then exits at step 1090.

Natural Language Support with Respect to Foreign Languages

Referring now to FIG. 11, an exemplary screenshot 1200 illustrating a graphical user interface (GUI) screen 1100 displayed by a suitable user interface (e.g., user interface 160 of FIG. 2) for query creation is shown. Illustratively, the GUI screen 1100 displays a panel 1110 for creation of an abstract query (e.g., abstract query 140 of FIG. 2) against an underlying database (e.g., database 130 of FIG. 2).

As was noted above, in one embodiment a language resource component (e.g., language resource component 150 of FIG. 2) for a given data abstraction model (e.g., data abstraction model 124 of FIG. 2) can be defined by a language resource file. The language resource file may include default natural language expressions for use in representing attributes of the data abstraction model to the user. In one embodiment, the default natural language expressions can be translated into any foreign languages or variants on a same language such as alternative terminology required by users or groups of users that access the data abstraction model. Furthermore, in one embodiment a given language resource component can be used to translate basic constructs of the underlying database and corresponding user interfaces that are suitable for query creation into a given foreign language, not just user application data. For example, field names used for comparison, comparison operators or database attributes can be automatically translated into the foreign language.

In one embodiment, a suitable language resource file(s) that is used to translate the data abstraction model or a given view is retrieved at startup/load time. At user login time, user-specific settings for the user are retrieved, such as from a user locale, and which translated resources are used for representing the data abstraction model is determined.

For instance, assume that an underlying user locale defines that a given user of the underlying database uses the Spanish language in the United States. Assume further that a given language resource component is configured to translate all basic constructs of the underlying database and corresponding user interfaces for query creation into the Spanish language. Furthermore, a suitable language resource file translates all attributes of an underlying data abstraction model into the Spanish language. By way of example, assume that the underlying data abstraction model is the exemplary data abstraction model of Table III above. Accordingly, all information shown in the panel 1110 is displayed in the Spanish language.

It should be noted that the panel 1110 illustratively includes a display area 1120 that is configured for specification of a query condition for the abstract query. By way of example, the display area 1120 is used to specify a query condition on the "Gender" field of the underlying data abstraction model. Assume now that a translation in the Spanish language is retrieved for all attributes of all logical fields of the exemplary data abstraction model of Table III above in the exemplary language resource file "SPANISH-XLIFF.xml" shown in Table XII below. For simplicity, elements of the "SPANISH-XLIFF.xml" language resource file are represented in a shorthand format. Persons skilled in the art will readily recognize corresponding XML representations. Further, for brevity, only parts that are relevant for the following explanations are shown, i.e., parts relating to the "Gender" field of the exemplary data abstraction model of Table III above.

TABLE XIII

| SPANISH-XLIFF FILE EXAMPLE |
| --- |
| 001 SPANISH-XLIFF.xml |
| 002 "Demographic.Gender:name" = "Género" |
| 003 "Demographic.Gender:val-Female" = "Hembra" |
| 004 "Demographic.Gender:val-Male" = "Varón" |
| 005 "Demographic.Gender:val-Unknown" = "Desconocido" |
| 006 "Demographic.Name:name" = "Apellido" |

The exemplary XLIFF language resource file of Table XIII illustratively includes Spanish expressions for each attribute included in the "Gender" field and the "Name" field of the exemplary data abstraction model of Table III. More specifically, the exemplary XLIFF language resource file includes in lines 002-005, on the left hand side of each line, a definition for an element (e.g., a logical field name or value) of the "Gender" field and, on the right hand side of each line, an associated Spanish expression. Similarly, in line 006 a definition for the logical field name of the "Name" field is associated with a corresponding Spanish expression.

In the given example, using the exemplary "SPANISH-XLIFF.xml" file of Table XIII, the display area 1120 displays an indication 1130 of the logical field name "Gender" (line 003 of Table III) using the Spanish expression "Género" (line 002 of Table XIII). Furthermore, indications of all alternative values associated with allowed physical values for the "Gender" field according to lines 004-006 of Table III are displayed in the display area 1120. Accordingly, an indication 1140 of the value "Female" (line 004 of Table III) using the Spanish expression "Hembra" (line 003 of Table XIII), an indication 1150 of the value "Male" (line 005 of Table III) using the Spanish expression "Varón" (line 004 of Table XIII) and an indication 1160 of the value "Unknown" (line 006 of Table III) using the Spanish expression "Desconocido" (line 005of Table XIII) are displayed.

In the display area 1120, the indications 1140, 1150 and 1160 are each associated with a corresponding user-selectable checkbox 1145, 1155 and 1165. Illustratively, the checkbox 1155 associated with the indication 1150 "Varón" is selected. Furthermore, a comparison operator "=iguales" is selected from a list 1170 of user-selectable operators for definition of the query condition. By activating a pushbutton 1180 "Actualización", the user requests creation of the query condition.

Referring now to FIG. 12, the GUI screen 1100 of FIG. 11 is shown after user-activation of the pus0hbutton 1180 "Actualización". Accordingly, the query condition is created and a summary 1210 thereof is shown in a display area 1220 of the panel 1110.

After specification of all query conditions and selection of required result fields, creation of the abstract query is completed. Assume now that the illustrative abstract query shown in Table XIV below is created using the GUI screen 1100 of FIGS. 11-12. By way of illustration, the illustrative abstract query is defined using XML. However, any other language may be used to advantage.

TABLE XIV

| ABSTRACT QUERY EXAMPLE |
| --- |
| 001 <?xml version="1.0"?> |
| 002 <QueryAbstraction> |
| 003   <Selection> |
| 004     <Condition relOperator="AND" fieldType="char" |
| 005       field="Gender" operator="EQ"> <Value val="Male"/> |
| 006     </Condition> |
| 007   </Selection> |
| 008   <Results> |
| 009     <Field name="Name"/> |
| 010     <Field name="Gender"/> |
| 011   </Results> |
| 012 </QueryAbstraction> |

Illustratively, the abstract query shown in Table XIV includes in lines 003-007 a selection specification containing the query condition that was created using the exemplary GUI screen 1100 of FIGS. 11-12 and in lines 00-011a results specification. By way of example, the results specification in lines 00-011requests name and gender information for patients in a hospital and refers to the "Name" field (line 007of Table III) and the "Gender" field (line 003of Table III) of the exemplary data abstraction model of Table III above.

It should be noted that all attributes in the exemplary abstract query of Table XIV are defined in the English language, i.e., the default language of the data abstraction model, although the abstract query shown in Table XIV was created using the GUI screen 1100 of FIGS. 11-12 that uses the Spanish language. In fact, in one embodiment abstract queries are only generated in the default language that is defined by the underlying data abstraction model to allow transformation of the abstract query into an executable query using the data abstraction model. As the default language of the exemplary data abstraction model of Table III is English, the exemplary abstract query of Table XIV is generated in English. This allows normalization of generated abstract queries and further allows database administrators, security officers and suitable security monitoring equipment to monitor the generated abstract queries regarding data security.

If the exemplary abstract query of Table XIV is transformed into an executable query that is executed against an underlying database (e.g., database 130 of FIG. 2), corresponding physical values are retrieved from the database. In one embodiment, where the underlying database is a multilingual database, the retrieved physical values are defined in different natural languages (e.g., English, Spanish and/or German). In order to output a corresponding result set on the basis of the retrieved physical values in a selected language (e.g., natural language result set 172 of FIG. 2) such as the language of the user (i.e., in the given example Spanish), further processing is required as described by way of example below with reference to FIGS. 13-15.

Natural Language Support for Multilingual Databases

Figure 13:
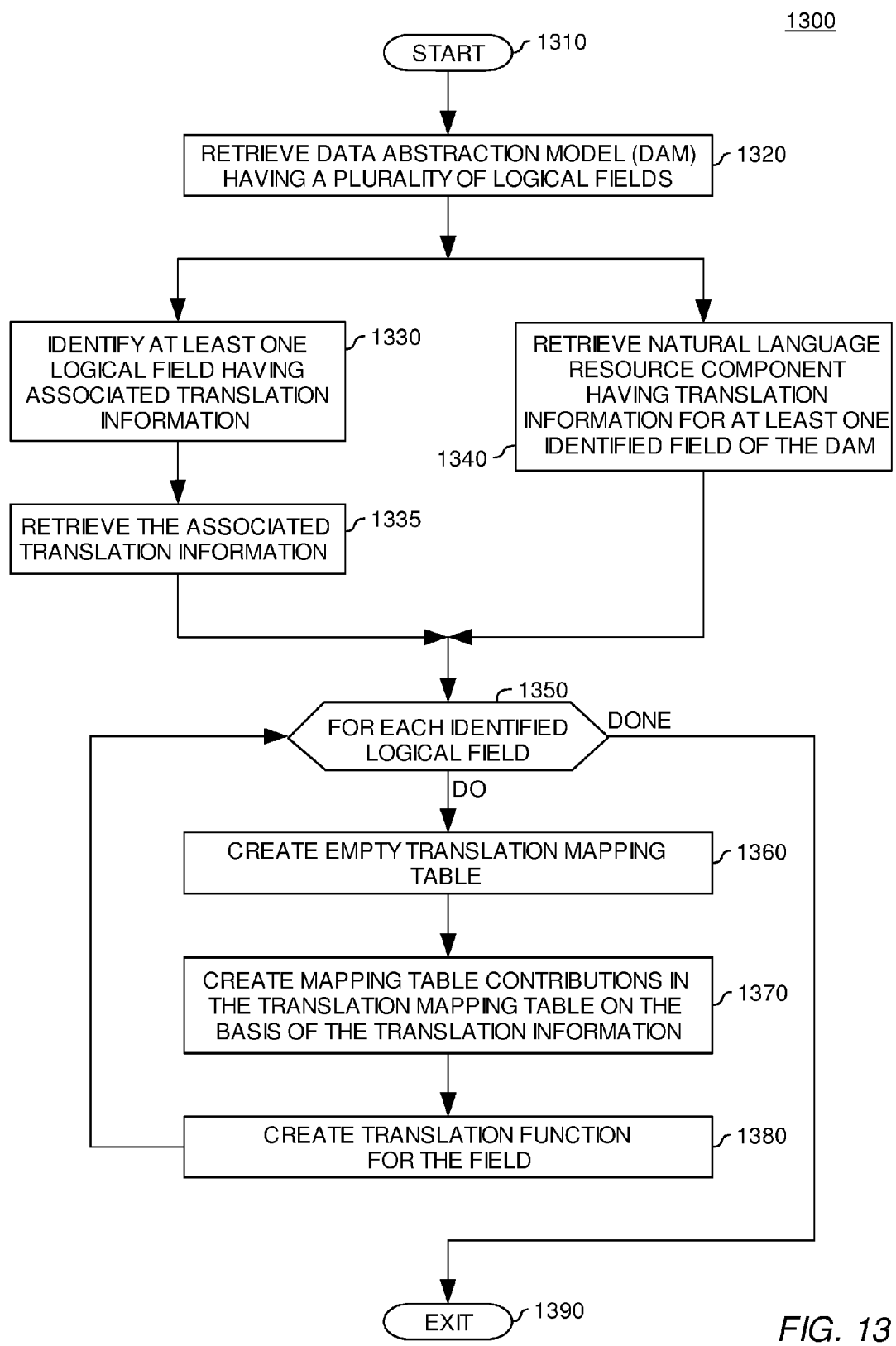
FIG. 13 is a flow chart illustrating a method of generating translation functions and translation mapping tables for natural language support in one embodiment.

Referring now to FIG. 13, one embodiment of a method 1300 for generating translation mapping tables (e.g., translation mapping tables 154 of FIG. 2) and translation functions (e.g., translation functions 152 of FIG. 2) for natural language support in multilingual databases is illustrated. The translation mapping tables and translation functions are generated for logical fields (e.g., logical fields 308 of FIGS. 3B-C) of one or more underlying data abstraction models (e.g., data abstraction model 124 of FIGS. 3B-C). The underlying data abstraction model(s) abstractly describes physical data (e.g., data 132 of FIG. 2) stored in one or more associated multilingual databases (e.g., database 130 of FIG. 2). In one embodiment, the method 1300 is performed by the NLS manager 120 of FIG. 2.

Method 1300 starts at step 1310. At step 1320, the underlying data abstraction model(s) which provides definitions for a plurality of logical fields is retrieved. For instance, assume that the exemplary data abstraction model of Table II is retrieved. As was noted above, the exemplary data abstraction model of Table II includes a plurality of logical fields including, besides others, a "MaritalStatus" (lines 033-044 of Table II) and a "Gender" (lines 045-055 of Table II) field.

At step 1330, at least one logical field having associated translation information is identified from the underlying data abstraction model(s). In one embodiment, the at least one logical field is identified on the basis of an attribute included with the definition of the logical field that is configured to indicate that the logical field has associated translation information. For instance, as noted above the at least one logical field may include a "multilingual" attribute that is set to "Yes". However, it should be noted that other implementations are possible. By way of example, metadata that is associated with the underlying data abstraction model(s) may indicate logical fields having associated translation information. In this case, the at least one logical field can be identified on the basis of the associated metadata. Accordingly, all such implementations are broadly contemplated.

In the given example, the "Gender" (lines 045-055 of Table II) field of the exemplary data abstraction model of Table II is identified at step 1330. As noted above, the "Gender" field includes a "multilingual" attribute ("multilingual="Yes") according to line 046 of Table II.

At step 1335, the associated translation information is retrieved. In one embodiment, retrieving the associated translation information includes retrieving one or more natural language resource components (e.g., language resource component 150 of FIG. 2) having the associated translation information. For instance, the associated translation information can be included with corresponding XLIFF language resource files as described above. In one embodiment, the associated translation information of the at least one logical field is identified on the basis of an attribute included with the definition of the logical field. For instance, the at least one logical field may include an attribute indicating a location of the associated translation information in an underlying computer system (e.g., computer system 110 of FIG. 1). However, it should be noted that other implementations are possible. By way of example, metadata that is associated with the underlying data abstraction model(s) may indicate the location of the associated translation information. In this case, the associated translation information of at least one logical field can be identified on the basis of the associated metadata. Accordingly, all such implementations are broadly contemplated. Processing then proceeds with step 1350.

In one embodiment, a separate XLIFF language resource file is provided with respect to each natural language that is used to define physical values in the underlying multilingual database. Furthermore, a given XLIFF language resource file may include translation information for a plurality of logical fields. The translation information that is associated with a given logical field can be identified from a corresponding XLIFF language resource file using one or more suitable attributes of the given field, such as the field name. In one embodiment, each XLIFF language resource file includes a translated value for each allowable value defined for each of the plurality of logical fields by the underlying data abstraction model(s) and/or each physical value included with the underlying multilingual database that is associated with one of the plurality of logical fields. All such implementations are broadly contemplated.

Assume that in the given example three XLIFF language resource files each having translation information for the "Gender" field are retrieved. Assume further that the retrieved XLIFF language resource files respectively include English, Spanish and German translations for allowable values of the "Gender" field. An exemplary XLIFF language resource file for the "Gender" field is illustrated by way of example in Table XV below. Assume now that the exemplary language resource file "LanguageConfiguration_es.xml" shown in Table XV below includes the Spanish translation information. For simplicity, elements of the exemplary "LanguageConfiguration_es.xml" language resource file are represented in a shorthand format. Persons skilled in the art will readily recognize corresponding XML representations. Further, for brevity, only parts that are relevant for the following explanations are shown, as explained in more detail below. It is noted that this manner of presentation applies to other tables described below as well.

TABLE XV

SPANISH XLIFF FILE EXAMPLE

| | |
|---|---|
| 001 | LanguageConfiguration_es.xml |
| 002 | "Birth, Age and Gender.Gender:val-Female" = "Hembra" |
| 003 | "Birth, Age and Gender.Gender:val-Male" = "Varón" |
| 004 | "Birth, Age and Gender.Gender:val-Unknown" = "Desconocido" |

TABLE XV-continued

SPANISH XLIFF FILE EXAMPLE

| | |
|---|---|
| 005 | "Birth, Age and Gender.MaritalStatus:val-Single" = "Solo" |
| 006 | "Birth, Age and Gender.MaritalStatus:val-Married" = "Casado" |
| 007 | "Birth, Age and Gender.MaritalStatus:val-Divorced" = "Divorciado" |
| 008 | "Birth, Age and Gender.MaritalStatus:val-Widowed" = "Viuda" |
| 009 | "Birth, Age and Gender.MaritalStatus:Unknown" = "Desconocido" |

The exemplary XLIFF language resource file of Table XV illustratively includes Spanish expressions for allowable values defined in the "Gender" field of the exemplary data abstraction model of Table II. The exemplary XLIFF language resource file of Table XV further includes Spanish expressions for allowable values defined in the "MaritalStatus" field of the exemplary data abstraction model of Table II. However, in one embodiment the exemplary XLIFF language resource file may include translation information for multiple different logical fields. For instance, translation information for an "Age" field of the underlying data abstraction model(s) that is suitable to translate age classes such as "Child", "Adolescent", "Adult" and "Senior" into the Spanish language could be included with the exemplary XLIFF language resource file. All such implementations are broadly contemplated.

It should be noted that the Spanish translations included with the exemplary XLIFF language resource file of Table XV are provided with respect to default language expressions represented in the English language, such as "Male", "Female" etc. In one embodiment, these default language expressions are derived from the underlying data abstraction model(s). In other words, as in the given example the default language expressions shown in the exemplary data abstraction model of Table II above are provided in English, the default language expressions in the exemplary XLIFF language resource file are also defined in English. However, the default language expressions used in the underlying data abstraction model(s) may depend on various factors such as the geographic location of a user of the underlying data abstraction model(s). In other words, for a German user residing in Germany, the default language expressions in the underlying data abstraction model(s) can be provided in the German language. Furthermore, the default language expressions used in the XLIFF language resource file may differ from the default language expressions used in the underlying data abstraction model(s). For instance, while the default language expressions can be provided in English as illustrated in the exemplary data abstraction model of Table II above, the default language expressions used in the XLIFF language resource file can be provided in German for a German user residing in Germany. All such implementations are broadly contemplated.

In the given example, English translation information is included with the exemplary language resource file "LanguageConfiguration_en.xml" shown in Table XVI below. For brevity, the English translation information is also provided with respect to the default language expressions shown in Table XV above which are defined in English.

TABLE XVI

ENGLISH XLIFF FILE EXAMPLE

| | |
|---|---|
| 001 | LanguageConfiguration_en.xml |
| 002 | "Birth, Age and Gender.Gender:val-Female" = "Female" |
| 003 | "Birth, Age and Gender.Gender:val-Male" = "Male" |
| 004 | "Birth, Age and Gender.Gender:val-Unknown" = "Unknown" |

TABLE XVI-continued

ENGLISH XLIFF FILE EXAMPLE

| | |
|---|---|
| 005 | "Birth, Age and Gender.MaritalStatus:val-Single" = "Single" |
| 006 | "Birth, Age and Gender.MaritalStatus:val-Married" = "Married" |
| 007 | "Birth, Age and Gender.MaritalStatus:val-Divorced" = "Divorced" |
| 008 | "Birth, Age and Gender.MaritalStatus:val-Widowed" = "Widowed" |
| 009 | "Birth, Age and Gender.MaritalStatus:Unknown" =" Unknown" |

Finally, the German translation information mentioned above is included in the given example with the exemplary language resource file "LanguageConfiguration_de.xml" shown in Table XVII below. For brevity, the German translation information is also provided for the default language expressions defined in the English language as shown in Table XV above.

TABLE XVII

GERMAN XLIFF FILE EXAMPLE

| | |
|---|---|
| 001 | LanguageConfiguration_de.xml |
| 002 | "Birth, Age and Gender.Gender:val-Female" = "Weiblich" |
| 003 | "Birth, Age and Gender.Gender:val-Male" = "Männlich" |
| 004 | "Birth, Age and Gender.Gender:val-Unknown" = "Unbekannt" |
| 005 | "Birth, Age and Gender.MaritalStatus:val-Single" = "Ledig" |
| 006 | "Birth, Age and Gender.MaritalStatus:val-Married" = "Verheiratet" |
| 007 | "Birth, Age and Gender.MaritalStatus:val-Divorced" = "Geschieden" |
| 008 | "Birth, Age and Gender.MaritalStatus:val-Widowed" = "Verwitwet" |
| 009 | "Birth, Age and Gender.MaritalStatus:Unknown" =" Unbekannt" |

In one embodiment, step 1340 is performed instead of steps 1330 and 1335. At step 1340, one or more natural language resource components (e.g., natural language resource component 150 of FIG. 2) having translation information for one or more identified logical fields of the underlying data abstraction model(s) are retrieved. For instance, all XLIFF language resource files associated with the underlying data abstraction model(s) are retrieved. On the basis of the retrieved natural language resource component(s), the logical fields having associated translation information can be identified. Processing then proceeds with step 1350.

For instance, assume that in the given example the exemplary XLIFF files of Tables XV-XVII are retrieved. On the basis of the exemplary XLIFF files of Tables XV-XVII, it can be determined that the "Gender" field (lines 045-055 of Table II) has associated translation information included with lines 002-004 of Tables XV-XVII. Furthermore, the "MaritalStatus" field (lines 033-044 of Table II) has associated translation information included with lines 005-009 of Tables XV-XVII.

As noted above, in one embodiment step 1340 is performed instead of steps 1330 and 1335. In this case, step 1340 is performed to retrieve translation information for all logical fields of the underlying data abstraction model(s) which have associated translation information. However, step 1340 can alternatively be performed asynchronously, i.e., in parallel to steps 1330 and 1335. In this case, step 1340 is performed to retrieve translation information for all logical fields that do not include suitable attributes indicating that the fields have associated translation information. Steps 1330 and 1335 are in this embodiment performed to retrieve the logical fields having such attributes, as described above. For instance, as noted above the "MaritalStatus" field (lines 033-044 of the exemplary data abstraction model of Table II) illustratively does not include a "Multilingual" attribute while the "Gender" field does include such an attribute. Accordingly, the "Gender" field is identified using steps 1330 and 1335 and the "MaritalStatus" field using step 1340, as described above. Still alternatively, step 1340 can be performed after execution of steps 1330 and 1335. In this case, step 1340 can be used to confirm whether all logical fields of the underlying data abstraction model(s) that have associated translation information were correctly identified. All such different implementations are broadly contemplated.

In one embodiment, the XLIFF language resource files are retrieved from storage (e.g., storage 138 of FIG. 1). However, at least a portion of the retrieved XLIFF language resource files can be generated when required, e.g., at startup time of a corresponding database session. For instance, when the user initially opens the GUI screen 1100 of FIG. 11 for query creation, a database session is initiated and the at least one portion of the XLIFF language resource files is generated. To this end, the underlying multilingual database is parsed to identify all natural language expressions of physical values included with the multilingual database. For instance, assume that in the given example the underlying multilingual database includes a "contact" table that is abstractly described by the exemplary data abstraction model of Table II. Assume further that the "contact" table has information about patients of hospitals in the United States, Mexico and Germany. An exemplary "contact" table is illustrated in Table XVIII below.

TABLE XVIII

CONTACT TABLE EXAMPLE

| | l_name | encoding | gender | m_status |
|---|---|---|---|---|
| 001 | | | | |
| 002 | Miller | en | Male | Married |
| 003 | Péron | es | Hembra | Casado |
| 004 | Schneider | de | Männlich | Verwitwet |
| 005 | Gonzalez | es | Varon | Solo |
| 006 | Meier | de | Weiblich | Ledig |
| 007 | Sanchez | es | Desconocido | Desconocido |
| 008 | Stewart | en | Male | Single |

As can be seen from line 001 of Table XVIII, the exemplary "contact" table includes last names ("l_name"), gender ("gender") and marital status ("m_status") information of the patients. In lines 002-008 data records related to different patients are illustrated. The exemplary "contact" table further includes an "encoding" column (line 001) that is suitable to identify the hospital where a given patient is treated. Illustratively, the "encoding" column includes the value "en" (lines 002 and 008) for patients of the American hospital, "es" (lines 003, 005 and 007) for patients of the Mexican hospital and "de" (lines 004 and 006) for patients of the German hospital. However, note that the "encoding" column is merely provided for purposes of illustration and not limiting of the invention. Instead, other information such as a source system identifier, a clinic or hospital number and/or a geographic location could be used in real life applications instead of the "encoding" information to indicate where a given data record is coming from. All such different implementations are broadly contemplated.

Note that the "gender" and "m_status" columns of the exemplary "contact" table of Table XVIII include physical values that are defined in different natural languages. Accordingly, in one embodiment these physical values can be retrieved and included as translated values with corresponding default language expressions into a corresponding XLIFF language resource file. By way of example, the corresponding default language expressions can be retrieved from a list definition of allowable values for an associated logical field in the underlying data abstraction model. For instance, using suitable machine translation services or other translation facilities, it can be determined that the "gender" value "Hembra" in line 003 of Table XVIII is the Spanish translation of the allowable value "Female" of the "Gender" field in line 051 of Table II. Thus, the data record in line 002 of Table XV can be created. However, other implementations for creation of the XLIFF language resource files are also possible. For instance, only suitable machine translation services can be used to provide a translation for the "Hembra" value in the exemplary XLIFF language resource file. All such different implementations are broadly contemplated.

At step 1350, a loop consisting of steps 1350 to 1380 is entered for each identified logical field of the underlying data abstraction model(s) that has associated translation information. As in the given example only the "Gender" and "MaritalStatus" fields have associated translation information, assume now that the loop consisting of steps 1350 to 1380 is initially entered for the "Gender" field.

At step 1360, an empty translation mapping table is created for the identified logical field. Then, at step 1370 mapping table contributions are created for the logical field in the empty translation mapping table using the retrieved translation information. More specifically, translated values for allowable values of the logical field and/or physical values that are retrieved from the underlying multilingual database for the logical field are included with the empty translation mapping table, whereby a translation mapping table is created for the logical field.

In the given example, assume that an empty "Gender-Info" table is created at step 1360 for the "Gender" field (lines 045-055 of Table II). Then, at step 1370 all translated values related to the "Gender" field are retrieved from the exemplary XLIFF files of Tables XV-XVII. The retrieved translated values are included with the empty "Gender-Info" table. Thus, a translation mapping table having translated values for physical values of the "gender" column in the exemplary "contact" table of Table XVIII above is created. An exemplary "Gender-Info" table is illustrated in Table XIX below.

TABLE XIX

GENDER-INFO TABLE EXAMPLE

| | ID | encoding | alternative_value |
|---|---|---|---|
| 001 | | | |
| 002 | 0 | en | Unknown |
| 003 | 1 | en | Male |
| 004 | 2 | en | Female |
| 005 | 0 | es | Desconocido |
| 006 | 1 | es | Varón |
| 007 | 2 | es | Hembra |
| 008 | 0 | de | Unbekannt |
| 009 | 1 | de | Männlich |
| 010 | 2 | de | Weiblich |

As can be seen from of Table XIX, an "alternative_value" column (line 001) includes for the "Gender" field in lines 002-004 translated values in the English language, in lines 005-007 in the Spanish language and in lines 008-010 in the German language. Note by way of example that the translated values in the Spanish language in lines 005-007 correspond to the translated values in lines 002-004 of the exemplary Spanish XLIFF language resource file of Table XV.

At step 1380, a translation function is created for the logical field. In the given example, a translation function is created at step 1380 for the "Gender" field (lines 045-055 of Table II). An exemplary illustrative translation function associated with the "Gender" field is shown in Table XX below.

TABLE XX

TRANSLATION FUNCTION EXAMPLE

```
001  translateGender (input desiredUserLocale, input EncodingValue,
002          input ColumnValue) {
003      select target_language.alternative_value
004      from Gender-Info source_language
005          left join Gender-Info target_language
006          on source_language.id=target_language.id
007      where
008          source_language.encoding=EncodingValue and
009          source_language.value=ColumnValue and
010          target_language.encoding=desiredUserLocale
011      return results.alternative_value
012  }
```

Illustratively, the exemplary translation function shown in Table XX is invoked using the function name "translateGender" in line 001. However, the exemplary translation function shown in Table XX itself does not include translation information. Instead, the exemplary translation function shown in Table XX retrieves required translation information from an associated translation mapping table. More specifically, the exemplary translation function of Table XX illustratively defines a SQL query in lines 003-010 that queries the exemplary "Gender-Info" table of Table XIX (lines 004-005 of Table XX). The exemplary "Gender-Info" table of Table XIX is queried for a given physical value ("source_language.value=ColumnValue" in lines 001 and 009) defined in a given natural language ("source_language.encoding=EncodingValue" in lines 001 and 008) to retrieve from the translated values a required alternative_value ("target_language.alternative_value" in line 003) in a selected language ("target_language.encoding=desiredUserLocale" in lines 001 and 010). The retrieved alternative_value is returned as output ("return results.alternative_value" in line 011).

Processing then returns to step 1350, where the loop consisting of steps 1350-1380 is performed for a next identified logical field. Assume now that in the given example the loop is subsequently performed for the "MaritalStatus" field. Thus, a translation mapping table having translated values for physical values of the "m_status" column in the exemplary "contact" table of Table XVIII above is created at steps 1360 and 1370. An exemplary "MaritalStatus-Info" table is illustrated in Table XXI below.

TABLE XXI

MARITALSTATUS-INFO TABLE EXAMPLE

| | ID | encoding | value |
|---|---|---|---|
| 001 | | | |
| 002 | 0 | en | Unknown |
| 003 | 1 | en | Single |
| 004 | 2 | en | Married |
| 005 | 3 | en | Divorced |
| 006 | 4 | en | Widowed |
| 007 | 0 | es | Desconocido |
| 008 | 1 | es | Solo |
| 009 | 2 | es | Casado |
| 010 | 3 | es | Divorciado |
| 011 | 4 | es | Viuda |
| 012 | 0 | de | Unbekannt |
| 013 | 1 | de | Ledig |
| 014 | 2 | de | Verheiratet |

TABLE XXI-continued

MARITALSTATUS-INFO TABLE EXAMPLE

| ID | encoding | value |
|---|---|---|
| 015 | 3 | de | Geschieden |
| 016 | 4 | de | Verwitwet |

As can be seen from Table XXI, lines 002-006 include translated values in the English language, lines 007-011 in the Spanish language and lines 012-016 in the German language. Note by way of example that the translated values in the Spanish language in lines 007-011 correspond to the translated values in lines 005-009 of the exemplary Spanish XLIFF language resource file of Table XV.

Assume further that an associated translation function is then created for the "MaritalStatus" field at step 1380. An exemplary illustrative translation function associated with the "MaritalStatus" field is shown in Table XXII below.

TABLE XXII

TRANSLATION FUNCTION EXAMPLE

```
001  translateMaritalStatus (input desiredUserLocale,
     input EncodingValue,
002           input ColumnValue) {
003       select target_language.alternative_value
004       from MaritalStatus-Info source_language
005       left join MaritalStatus-Info target_language
006       on source_language.id=target_language.id
007       where
008           source_language.encoding=EncodingValue and
009           source_language.value=ColumnValue and
010           target_language.encoding=desiredUserLocale
011       return results.alternative_value
012  }
```

Note that the exemplary translation function shown in Table XXII accesses the exemplary "MaritalStatus-Info" table of Table XXI (lines 004-005). However, the exemplary translation function shown in Table XXII is otherwise similar to the exemplary translation function shown in Table XX above and, thus, not explained in more detail for brevity.

When the loop consisting of steps 1350-1380 was performed for each identified logical field, processing exits at step 1390. In the given example, as only the "Gender" and "MaritalStatus" fields were identified, processing exits at step 1390 after creation of the exemplary translation function of Table XXII above.

It should be noted that in the illustrated example two separate translation mapping tables (i.e., the "Gender-Info" table of Table XX and the "MaritalStatus-Info" table of Table XXII) were created. However, in one embodiment only a single translation mapping table is created for all identified logical fields. For instance, in the given example the "Gender-Info" and "MaritalStatus-Info" tables can be combined into a single "Translation-Info" table. In this case, a single translation function accessing the single "Translation-Info" table can be provided for all identified logical fields. However, if a single translation mapping table is used, each mapping table contribution having a translated value in a given language needs to be identified with a unique identifier. By way of example, in the given example the identifier "1" of the translated value "Single" in line 003 of Table XXI needs to be modified to another value such as, e.g., "11" to avoid confusion with the translated value "Male" in line 003 of Table XIX having also the identifier "1".

Natural Language Support in Query Execution

Figure 14:
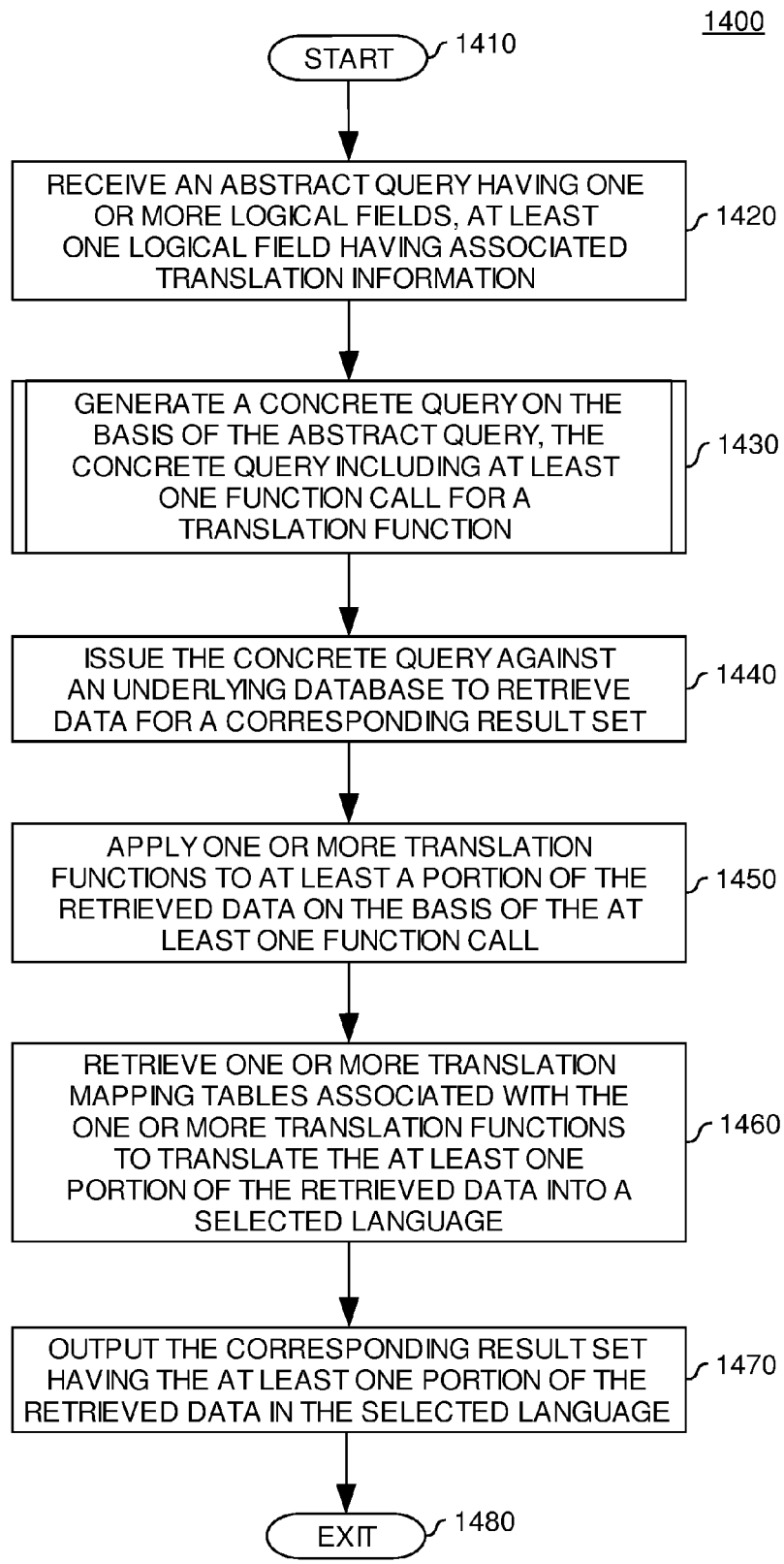
FIG. 14 is a flow chart illustrating a method of providing natural language support for query processing in one embodiment.

Referring now to FIG. 14, one embodiment of a method 1400 of providing natural language support for users running queries against a multilingual database (e.g., database 130 of FIG. 2) is illustrated. At least a portion of the steps of method 1400 can be performed by the runtime component 126 and/or the NLS manager 120 of FIG. 2. Method 1400 starts at step 1410.

At step 1420, an abstract query (e.g., abstract query 140 of FIG. 2) including one or more result and/or query condition fields, each corresponding to a logical field of an underlying data abstraction model (e.g., data abstraction model 124 of FIG. 2), is received. In one embodiment, at least one result field included with the abstract query has associated translation information. By way of example, assume that the exemplary abstract query of Table XXIII below is received at step 1420. For simplicity, the exemplary abstract query shown in Table XXIII is defined in natural language.

TABLE XXIII

ABSTRACT QUERY EXAMPLE

```
001  FIND
002      LastName, Gender, MaritalStatus
003  WHERE
004      MaritalStatus = 'Single'
```

The exemplary abstract query of Table XXIII includes three result fields (line 002) and is configured to retrieve last names ("LastName" in line 002), gender information ("Gender" in line 002) and marital status information ("MaritalStatus" in line 002) for patients from the multilingual database. The exemplary abstract query of Table XXIII further includes a query condition (line 004) that restricts returned data to data of patients having the marital status "Single". It should be noted that the exemplary abstract query shown in Table XXIII includes the result and query condition fields "Marital Status" (lines 002-004) and the result field "Gender" (line 002) which refer to the "Marital Status" and "Gender" fields of the exemplary data abstraction model of Table II (lines 033-044 and 045-055 of Table II, respectively) and have associated translation information, as described above with reference to Tables XIX and XXI.

Assume now that the exemplary abstract query of Table XXIII is issued by a user using the user interface 160 of FIG. 2. Assume further that the user is an English speaking user, i.e., a user having a user locale that defines as encoding value "en". Accordingly, a corresponding query result (e.g., natural language result set 172 of FIG. 2) should be presented to the user in the English language.

At step 1430, an executable query is generated on the basis of the received abstract query. One embodiment of generating an executable query on the basis of an abstract query including at least one result field having associated translation information is described in more detail below with reference to FIG. 15.

Assume now that in the given example the exemplary executable query of Table XXIV below is generated on the basis of the exemplary abstract query of Table XXIII. By way of illustration, the illustrative executable query is defined using SQL. However, any other language such as XML may be used to advantage.

TABLE XXIV

EXECUTABLE QUERY EXAMPLE

```
001  SELECT DISTINCT
002      "t1"."l_name" AS "LastName",
003      "functions"."translateGender"('en', "t1"."encoding",
             "t1"."gender")
004              AS "Gender",
005      "functions"."translateMaritalStatus"('en', "t1"."encoding",
             "t1"."m_status")
006              AS "MaritalStatus"
007  FROM
008      "contact" "t1"
009  WHERE
010      "functions"."translateMaritalStatus"('en', "t1"."encoding",
             "t1"."m_status")
011              = 'Single'
```

Illustratively, the exemplary executable query of Table XXIV includes a results specification in lines 001-006 requesting data from a "l_name" column (line 002), a "gender" column (lines 003-004) and a "m_status" column (lines 005-006) of the exemplary database table "contact" of Table XVIII (line 008). Furthermore, according to the query condition in lines 010-011 of Table XXIV, only data for patients having a marital status of "Single" should be returned for the query.

It should be noted that in the exemplary executable query of Table XXIV the "Gender" result field (lines 003-004 of Table XXIV) includes a function call ("functions"."translateGender") for the exemplary translation function "TranslateGender" of Table XX above. Furthermore, the "MaritalStatus" result and condition fields (lines 005-006 and 010-011 of Table XXIV) include a function call for the exemplary translation function "TranslateMaritalStatus" of Table XXII above.

At step 1440, the executable query is executed against the underlying multilingual database to retrieve data for a corresponding result set. To this end, the executable query is executed to retrieve physical values defined in one or more different natural languages from the multilingual database. In the given example, the exemplary executable query of Table XXIV is executed against the exemplary "contact" table of Table XVIII.

In one embodiment, user-specific settings associated with the user issuing the query are identified when executing the executable query or prior to query execution. From the identified user-specific settings, the selected language of the user can be identified. For instance, the user-specific settings may define a role of the user; a language setting of the user, a view of the multilingual database defined for the user and/or other user-specific parameters. In the given example, the language setting can be configured to allow identification of the selected language of the user.

At step 1450, each translation function is executed on data retrieved for result and/or condition fields having corresponding function calls. In other words, in the given example the exemplary translation function "TranslateGender" of Table XX above is executed for all gender information retrieved from the "gender" column of the exemplary "contact" table of Table XVIII. Furthermore, the exemplary translation function "TranslateMaritalStatus" of Table XXII above is executed for all marital status information retrieved from the "m_status" column of the exemplary "contact" table of Table XVIII.

At step 1460, at least one data structure mapping at least a portion of the identified physical values to translated values defined in a selected language is identified from the executed translation function(s). In the given example, the exemplary "Gender-Info" table of Table XIX is identified from the exemplary translation function "TranslateGender" of Table XX. Furthermore, the exemplary "MaritalStatus-Info" table of Table XXI is identified from the exemplary translation function "TranslateMaritalStatus" of Table XXII.

The identified data structure(s) is (are) accessed to retrieve the translated values related to the identified physical values in the selected language. The retrieved translated values of all identified data structures define the alternative values defined in the selected language. More specifically, in the given example all physical values retrieved from the "gender" column of the exemplary "contact" table of Table XVIII for patients having the marital status "Single" are translated into alternative values in the English language using the exemplary "Gender-Info" table of Table XIX, as explained in more detail below with reference to Table XXV. Furthermore, all physical values retrieved from the "m_status" column of the exemplary "contact" table of Table XVIII are translated into alternative values in the English language using the exemplary "MaritalStatus-Info" table of Table XXI.

At step 1470, a corresponding result set (e. g., natural language result set 172 of FIG. 2) having the retrieved alternative values in the selected language is returned. Assume that in the given example the exemplary result set of Table XXV below, which is defined in the English language according to the user locale "en" of the user, is returned to the user.

TABLE XXV

RESULT SET EXAMPLE

| 001 | LastName | Gender | MaritalStatus |
|---|---|---|---|
| 002 | Gonzalez | Male | Single |
| 003 | Meier | Female | Single |
| 004 | Stewart | Male | Single |

As can be seen from Table XXV, the exemplary result set includes three data records in lines 002-004 having last names ("LastName"), gender ("Gender") and marital status ("MaritalStatus") information. The data records in lines 002-004 correspond to the data records in lines 00, 006and 008of the exemplary "contact" table of Table XVIII above.

Note that the gender and marital status information is only presented in the English language. For instance, when the data record in lines 005of the exemplary "contact" table of Table XVIII is accessed at query execution runtime to determine whether this data record should be included with the exemplary result set of Table XXV, it is initially determined whether this data record satisfies the query condition in lines 01-011of Table XXIV. To this end, the marital status value "Solo" and the encoding value "es" are retrieved from line 005of the exemplary "contact" table of Table XVIII and input together with the user locale "en" to the exemplary translation function "TranslateMaritalStatus" of Table XXII. As noted above, the exemplary translation function "TranslateMaritalStatus" of Table XXII accesses the exemplary "MaritalStatus-Info" table of Table XXI and then retrieves the identifier "1" from line 008of Table XXI using the marital status value "Solo" and the encoding value "es". Then, using the identifier "1" and the user locale "en", the exemplary translation function "TranslateMaritalStatus" of Table XXII identifies as alternative value the translated value "Single" from line 003of Table XXI. Similarly, each alternative value presented in the exemplary result set of Table XXV is retrieved.

At step 1470, the corresponding result set having at least a portion of the physical values retrieved from the multilingual database translated into the selected language is output. In the given example, the exemplary result set of Table XXV is output to the user. Processing then exits at step 1480.

Figure 15:
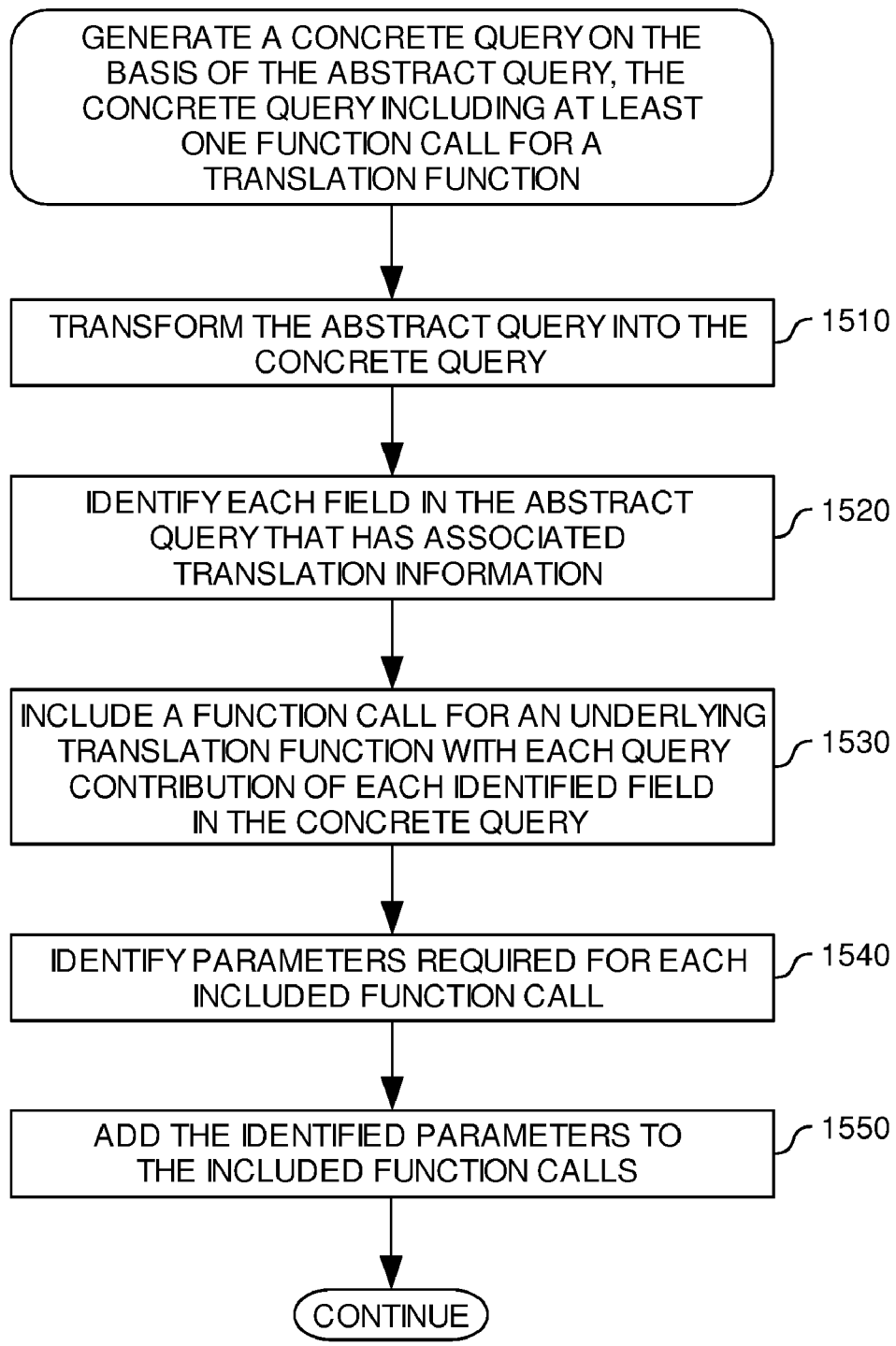
FIG. 15 is a flow chart illustrating a method of generating an executable query in one embodiment.

Referring now to FIG. 15, one embodiment of a method 1500 for generating an executable query from an abstract query (e.g., abstract query 140 of FIG. 2) according to step 1430 of FIG. 14 is illustrated. At least a portion of the steps of method 1500 can be performed by the runtime component 126 and/or the NLS manager 120 of FIG. 2.

Method 1500 starts at step 1510, where the abstract query is transformed into an executable query. In one embodiment, the abstract query is transformed into the executable query according to method 400 of FIG. 4 and method 500 of FIG. 5 as described above.

At step 1520, each result and/or query condition field in the abstract query that has associated translation information is identified as described above with reference to FIG. 13. In the given example, the fields "Gender" and "MaritalStatus" are identified. Furthermore, each query contribution of an identified field is retrieved from the executable query.

At step 1530, each retrieved query contribution from the executable query is associated with a function call for a corresponding translation function. For instance, in the given example the "Gender" field contribution in the executable query is associated with a function call for the exemplary "TranslateGender" translation function of Table XX and the "MaritalStatus" field contribution in the executable query is associated with a function call for the exemplary translation function "TranslateMaritalStatus" of Table XXII. In one embodiment, each required translation function can be identified on the basis of corresponding logical field names of the identified fields.

At step 1540, input parameters required for each associated function call are determined. For instance, in the given example the input parameters 'en', "t1"."encoding" and "t1"."gender" are determined for the function call for the exemplary "TranslateGender" translation function of Table XX. The input parameters 'en', "t1"."encoding" and "t1"."m_status" are determined for the function call for the exemplary "TranslateMaritalStatus" translation function of Table XXII.

At step 1550, the determined parameters are included with the associated function calls in the executable query. Thereby, the exemplary executable query of Table XXIV above is generated in the given example. Processing then continues at step 1440 of FIG. 14.

Note that the method 1500 of FIG. 15 is merely described by way of example to illustrate one embodiment of a method for generating an executable query from an abstract query according to step 1430 of FIG. 14. However, other implementations are possible. For instance, in one embodiment steps 1520 to 1550 can be implemented as integral part of the method 400 of FIG. 4 or the method 500 of FIG. 5. Accordingly, all such different implementations are broadly contemplated.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer-implemented method of providing language transformation support, comprising:
identifying one or more physical values defined by physical data in a multilingual database for a query result associated with an executed query, wherein the physical data in the multilingual database is provided in a plurality of different natural languages;
executing at least one translation function configured to transform at least a portion of the identified physical values defined in at least one language of the plurality of different natural languages into alternative values defined in a selected language different from the at least one language, comprising:
(i) identifying, from each executed translation function, a data structure mapping at least a portion of the identified physical values to translated values defined in the selected language; and
(ii) retrieving the translated values in the selected language from each identified data structure, the retrieved translated values of all identified data structures defining the alternative values defined in the selected language; and
outputting the query result associated with the executed query including the alternative values defined in the selected language.

2. The method of claim 1, wherein each identified data structure maps a multiplicity of values defined by the physical data in the multilingual database to corresponding translated values defined in the selected language, the multiplicity of values including the at least one portion of the one or more identified physical values and the translated values of all identified data structures including the alternative values.

3. The method of claim 2, wherein each identified data structure is created on the basis of one or more language resource components, each having translation information configured to transform the multiplicity of values defined by the physical data in the multilingual database to the corresponding translated values defined in the selected language.

4. The method of claim 1, wherein the query is an abstract query comprising a plurality of logical fields defined by a data abstraction model abstractly describing the physical data in the multilingual database.

5. The method of claim 1, wherein executing the translation function further comprises:
identifying user-specific settings associated with a user issuing the query; and
determining the selected language on the basis of the identified user-specific settings.

6. The method of claim 5, wherein the user-specific settings comprise at least one of: (i) a role of the user; (ii) a language setting of the user; and (iii) a view of the multilingual database defined for the user.

7. The method of claim 5, wherein each data structure mapping at least a portion of the identified physical values to the corresponding translated values defined in the selected language is identified on the basis of the identified user-specific settings.

8. The method of claim 7, wherein the query is an abstract query comprising a plurality of logical fields defined by a data abstraction model abstractly describing the physical data in the multilingual database, the method further comprising:
identifying, from the plurality of logical fields, at least one logical field having one or more allowed values, at least a portion of the one or more allowed values corresponding to values in one or more of the plurality of different languages in the multilingual database;
retrieving one or more language resource components configured to transform the one or more allowed values into the corresponding values defined in one or more of the plurality of different languages, the corresponding values including at least a portion of the alternative values; and generating at least one of the one or more identified data structures on the basis of the retrieved one or more language resource components.

9. The method of claim 8, wherein retrieving the one or more language resource components comprises:
   retrieving the one or more allowed values from the at least one logical field;
   retrieving the values in the one or more of the plurality of different languages corresponding to the at least one portion of the one or more allowed values from the multilingual database; and
   generating the one or more language resource components on the basis of the retrieved one or more allowed values and the retrieved corresponding values.

10. The method of claim 9, further comprising:
   determining values in the one or more of the plurality of different languages corresponding to allowed values that are not included with the at least one portion of the one or more allowed values using one or more machine translation services.

11. The method of claim 8, wherein retrieving the one or more language resource components comprises:
   determining whether the at least one logical field is associated with corresponding translation information; wherein the one or more language resource components is retrieved only if the at least one logical field is associated with corresponding translation information.

12. A computer-readable medium containing a program which, when executed by a processor, performs a process of providing language transformation support, the process comprising:
   identifying one or more physical values defined by physical data in a multilingual database for a query result associated with an executed query, wherein the physical data in the multilingual database is provided in a plurality of different natural languages;
   executing at least one translation function configured to transform at least a portion of the identified physical values defined in at least one language of the plurality of different natural languages into alternative values defined in a selected language different from the at least one language, comprising:
      (i) identifying, from each executed translation function, a data structure mapping at least a portion of the identified physical values to translated values defined in the selected language; and
      (ii) retrieving the translated values in the selected language from each identified data structure, the retrieved translated values of all identified data structures defining the alternative values defined in the selected language; and
   outputting the query result associated with the executed query including the alternative values defined in the selected language.

13. The computer-readable medium of claim 12, wherein each identified data structure maps a multiplicity of values defined by the physical data in the multilingual database to corresponding translated values defined in the selected language, the multiplicity of values including the at least one portion of the one or more identified physical values and the translated values of all identified data structures including the alternative values.

14. The computer-readable medium of claim 13, wherein each identified data structure is created on the basis of one or more language resource components, each having translation information configured to transform the multiplicity of values defined by the physical data in the multilingual database to the corresponding translated values defined in the selected language.

15. The computer-readable medium of claim 12, wherein the query is an abstract query comprising a plurality of logical fields defined by a data abstraction model abstractly describing the physical data in the multilingual database.

16. The computer-readable medium of claim 12, wherein executing the translation function further comprises:
   identifying user-specific settings associated with a user issuing the query; and
   determining the selected language on the basis of the identified user-specific settings.

17. The computer-readable medium of claim 16, wherein the user-specific settings comprise at least one of: (i) a role of the user; (ii) a language setting of the user; and (iii) a view of the multilingual database defined for the user.

18. The computer-readable medium of claim 16, wherein each data structure mapping at least a portion of the identified physical values to the corresponding translated values defined in the selected language is identified on the basis of the identified user-specific settings.

19. The computer-readable medium of claim 18, wherein the query is an abstract query comprising a plurality of logical fields defined by a data abstraction model abstractly describing the physical data in the multilingual database, the process further comprising:
   identifying, from the plurality of logical fields, at least one logical field having one or more allowed values, at least a portion of the one or more allowed values corresponding to values in one or more of the plurality of different languages in the multilingual database;
   retrieving one or more language resource components configured to transform the one or more allowed values into the corresponding values defined in one or more of the plurality of different languages, the corresponding values including at least a portion of the alternative values; and
   generating at least one of the one or more identified data structures on the basis of the retrieved one or more language resource components.

20. The computer-readable medium of claim 19, wherein retrieving the one or more language resource components comprises:
   retrieving the one or more allowed values from the at least one logical field;
   retrieving the values in the one or more of the plurality of different languages corresponding to the at least one portion of the one or more allowed values from the multilingual database; and
   generating the one or more language resource components on the basis of the retrieved one or more allowed values and the retrieved corresponding values.

21. The computer-readable medium of claim 20, wherein retrieving the one or more language resource components further comprises:
   determining values in the one or more of the plurality of different languages corresponding to allowed values that are not included with the at least one portion of the one or more allowed values using one or more machine translation services.

22. The computer-readable medium of claim 19, wherein retrieving the one or more language resource components comprises:
   determining whether the at least one logical field is associated with corresponding translation information; wherein the one or more language resource components is retrieved only if the at least one logical field is associated with corresponding translation information.

* * * * *